United States Patent [19]

Moore et al.

[11] Patent Number: 4,495,516
[45] Date of Patent: Jan. 22, 1985

[54] FILM VIDEO PLAYER HAVING FLASH ILLUMINATED AREA IMAGE SENSOR AND SINGLE FRAME CCD IMAGE SENSOR FOR USE THEREWITH

[75] Inventors: Leslie G. Moore; Te-Hsung Lee, both of Webster, N.Y.

[73] Assignee: Eastman Kodak Company, Rochester, N.Y.

[21] Appl. No.: 426,426

[22] Filed: Sep. 29, 1982

[51] Int. Cl.³ .............................................. H04N 9/11
[52] U.S. Cl. ........................................ 358/54; 358/44
[58] Field of Search ..................... 358/43, 44, 54, 78

[56] References Cited

U.S. PATENT DOCUMENTS

| | | | |
|---|---|---|---|
| 2,303,960 | 12/1942 | Seeley | 178/7.2 |
| 3,778,545 | 12/1973 | Metzger et al. | 178/7.2 |
| 4,001,878 | 1/1977 | Weimer | 358/41 |
| 4,057,830 | 11/1977 | Adcock | 358/127 |
| 4,087,839 | 5/1978 | Lemelson | 358/214 |
| 4,097,892 | 6/1978 | Balding | 358/80 |
| 4,132,469 | 1/1979 | Harvey | 353/25 |
| 4,163,256 | 7/1979 | Adcock | 358/127 |
| 4,227,207 | 10/1980 | Millward | 358/54 |
| 4,245,240 | 1/1981 | Tanaka | 358/43 |
| 4,266,246 | 5/1981 | Waldron et al. | 358/54 |
| 4,296,438 | 10/1981 | Stemme et al. | 358/214 |
| 4,306,252 | 12/1981 | Fearnside | 358/206 |

OTHER PUBLICATIONS

Electronics, 3/1/1979, p. 70, "Simple Method Uses Peristaltic CCD's to Display Color Slides on TV Set".
SMPTE Journal, Sep. 1972, vol. 81, No. 9, p. 661, "Color Negative in the Telecine" by Wood et al.
SMPTE Journal, Dec. 1978, vol. 87, No. 12, p. 815, "A Continuous-Motion Color Film Telecine Using CCD Line Sensors" by Poetsch.
SMPTE Journal, Apl., 1978, vol. 87, No. 4, p. 209, "An Experimental Telecine Using a Line-Array CCD Sensor", by Childs and Sanders.
"An All-Electronic Camera By Kodak?" Times Union Newspaper, Wed., Oct. 28, 1981.

*Primary Examiner*—Richard Murray
*Attorney, Agent, or Firm*—Thomas H. Close

[57] ABSTRACT

A film video player for sensing a color negative film image to produce color positive video signals includes a single frame charge coupled device (CCD) image sensor having an integral color filter array for producing color negative video signals when illuminated with a negative color image. The single frame CCD image sensor is flash illuminated with an image from the color negative film during the vertical retrace intervals of the video signals. Signal processing circuitry inverts and color corrects the signals produced by the sensor to produce color positive video signals. To reduce readout clock frequencies, the single frame image sensor is provided with a pair of parallel output registers. Even numbered columns of the array are read out via one of the registers, and odd numbered columns the other. Odd numbered columns are overlayed with green filter stripes and even numbered columns are overlayed with alternate red and blue stripes. The signals from the output register serving the odd numbered columns are demultiplexed by switching back and forth between two identical output amplifiers.

7 Claims, 21 Drawing Figures

FILM VIDEO PLAYER HAVING FLASH ILLUMINATED AREA IMAGE SENSOR AND SINGLE FRAME CCD IMAGE SENSOR FOR USE THEREWITH

BACKGROUND OF THE INVENTION

Cross Reference To Related Applications

U.S. application Ser. No. 427,061, "Film Video Player with Zoom and Scan", filed on even date herewith by S. Brownstein;

U.S. application Ser. No. 427,077, "Film Video Player with Zoom, Scan, and Automatic Border Control", filed on even date herewith by W. Fearnside; and U.S. application Ser. No. 427,060, "Packette for Processed Color Negative Film and Film Video Player Cooperating Therewith", filed on even date herewith by S. Brownstein; and U.S. application Ser. No 427,069, "Video Player, Film Medium, and Photographic Printer For Automatic Cropping", filed on even date herewith by S. Brownstein.

Field of the Invention

The present invention relates to a film video player for sensing color negative film to produce a color television signal, and more particularly to such a film video player employing a solid state image sensing array for sensing the film image.

Discussion of the Problem

Apparatus for sensing positive or negative photographic color film to produce a television signal are well known. Typical prior art color film video players employ a flying spot scan generator, such as a CRT, with a plurality of photomultiplier tubes and associated color filters to generate color video signals. See for example, U.S. Pat. No. 4,132,469 issued Jan. 2, 1979 to D. M. Harvey, which discloses a video player for disc format photographic film units. Such flying spot scanner systems require a high voltage power supply, are very bulky and require a high level of maintenance.

Another approach to film sensing is to provide a film viewing attachment for a color television camera, comprising a film gate, a light source, and a mechanical support for holding the television camera. One such film viewing attachment is sold by the Sony Corporation under the tradename Sony Video Adapter—Model No. HVT 3100. Such a viewing attachment is relatively simple and inexpensive, but the color video camera is not. Furthermore, the video camera is optimized for viewing normal photographic subjects and not color transparencies, consequently the quality of the video signal produced by this arrangement is not the best.

It has also been proposed to employ self scanned solid state image sensing arrays in color film video players. Typically, such applications contemplate a linear image sensing array for scanning in the horizontal direction and moving either the film or an optical component, such as a mirror or optical polygon, for scanning in the vertical direction. See for example, U.S. Pat. No. 4,306,252, which employs a scanning mirror for vertical deflection in a film video player.

Heretofore, the use of mechanical means such as a moving mirror or polygon for effecting vertical scanning has been seen as a desirable tradeoff between complexity of the solid state sensor array, the mechanical complexity of the video player apparatus, and the intensity of the light source needed for illuminating the film image. Solid state area array image sensors that have been proposed for use in video cameras have an imaging area exposed to light, and a storage area where the photosignals generated by the imaging area are stored while they are being read out of the sensor at the video line rate. The storage array doubles the complexity of the device, thereby reducing the device yield and increasing the costs of the image sensing device.

Proposals for making color image sensors include the use of a plurality of sensor arrays exposed through different colored filters, a single array with an integral color filter mosaic disposed over individual image sensors on the array, or some combination of these two approaches (for example two arrays, one with a single color filter overlay, and another with a two-color mosaic overlay). Plural arrays with colored filters have the problem of mechanical complexity, bulk, and the need for careful optical alignment between the separate arrays. Conventional area image sensing arrays with integral mosaic color filters are mechanically simpler and less bulky. Unfortunately, this approach suffers from the shortcoming that the number of sensor elements required to achieve standard color television resolution is very large, thereby reducing the device yield and increasing the cost.

The problem faced by the inventors therefore, was to provide a film video player apparatus and solid state sensor for use therewith that would avoid the shortcomings of the prior art noted above.

SOLUTION TO THE PROBLEMS—SUMMARY OF THE INVENTION

The film video player apparatus, and image sensor for use therewith according to our invention solves the problems noted above by providing a single frame charge coupled device (CCD) area array color image sensor and illuminating the sensor with a flash during the vertical retrace interval of the standard television signal. After the sensor has been flash illuminated, it is read out in the dark at the standard video line rate, thereby obviating the need for a separate frame storage array and reducing the required size of the sensor by half. In a preferred embodiment of the invention, the image sensor includes a pair of output shift registers, one register receives photosignals from the odd columns of the array, and the other register receives photosignals from the even columns of the array. The image sensor is provided with an integral filter pattern of vertical additive primary color filter stripes. Alternate columns of the sensor array are covered with green filter stripes, and the remaining columns are covered with alternate blue and red stripes. The photosignals from the columns covered with the green filter stripes are delivered to one of the output shift registers, and the photosignals from the columns covered with the blue and red filter stripes are delivered to the other output shift register. The output shift registers are read out simultaneously, and the signals from the register containing the "blue" and "red" signals are demultiplexed resulting in a relatively higher resolution green signal and relatively lower resolution red and blue signals.

DESCRIPTION OF THE DRAWINGS

The invention will be described with reference to the drawings, wherein.

DESCRIPTION OF THE PREFERRED EMBODIMENTS

The present invention will be described with specific reference to a film video player for generating a color television signal from disc format color negative film. It will be clear to one skilled in the art that the invention is not limited to color negative disc film players and may be employed in video players for use with other film formats such as size 110, 126, or 135.

I. Overall Description

Figure 1:
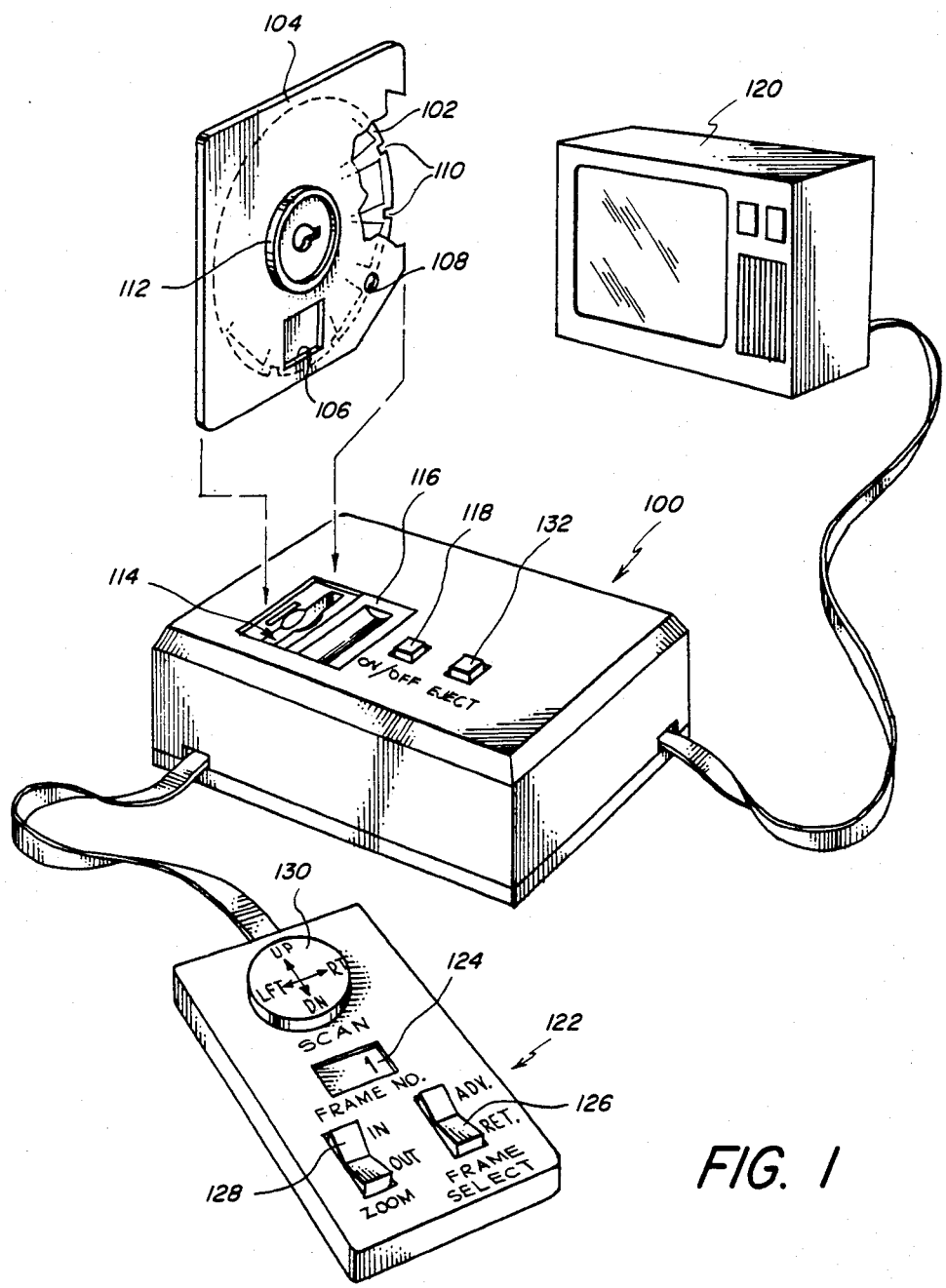
FIG. 1 is a perspective view of a video player for sensing color negative disc film to produce a video signal.

The color film video player generally designated 100 in FIG. 1, is a device for generating a color television signal from a disc format color negative film. A film disc 102 for use in the video player is contained in packette 104. The packette defines a window 106 that is open on both sides of the packette, for projecting light through a frame on the film disc. An alignment hole 108 is provided in the packette for aligning a film frame in the window, using the alignment notches 110, around the periphery of the film disc. The film disc is supported loosely in the packette and is free to rotate about the central axis of a hub 112 attached to the film disc. The hub is accessible through a central aperture in the packette.

To operate the video player, the main power is turned on, via an on/off switch 118, then a packette is placed in a slot 114 in the top of the player. After inserting the packette, a sliding door 116 is closed over the slot, whereupon the video player automatically locates the first frame on the film disc and displays the image of the first frame on a television set or color monitor 120 at normal magnification. The video player automatically reverses the color of the image from negative to positive, and provides exposure control and color correction.

The video player can be controlled by an operator through a hand held control unit 122. A two digit display 124 shows the operator the number of the frame on the film disc that is being viewed on the television. Frames are advanced or backspaced by manipulating a rocker switch 126. If the rocker switch is held for a time in one direction, the frame number display 124 will advance or backspace in a stream. When the rocker switch 126 is released the player will automatically locate via the shortest path and then display the frame shown on the display 124. The image on the television screen can be enlarged continuously up to a predetermined maximum magnification by manipulating a rocker switch 128. When the image is enlarged, the portion of the image being displayed can be shifted right or left and/or up or down by manipulating a joystick-type actuator 130. When a new frame is selected by the operator, the video player automatically returns to normal magnification and recenters the frame. Display is terminated, and the packette is ejected by actuating an eject button 132.

The video player operates by flash exposing a color negative image from the film disc onto a solid state charge coupled device image sensor during the vertical retrace intervals of a standard television signal. After each flash exposure, the image sensor is read out line by line at the standard video line rate to produce three color signals. The color signals are inverted, color corrected, and enhanced by signal processing electronics to produce R, G, and B color video signals for display on a color monitor, or a standard NTSC color video signal for display on a color television receiver.

Figure 2:
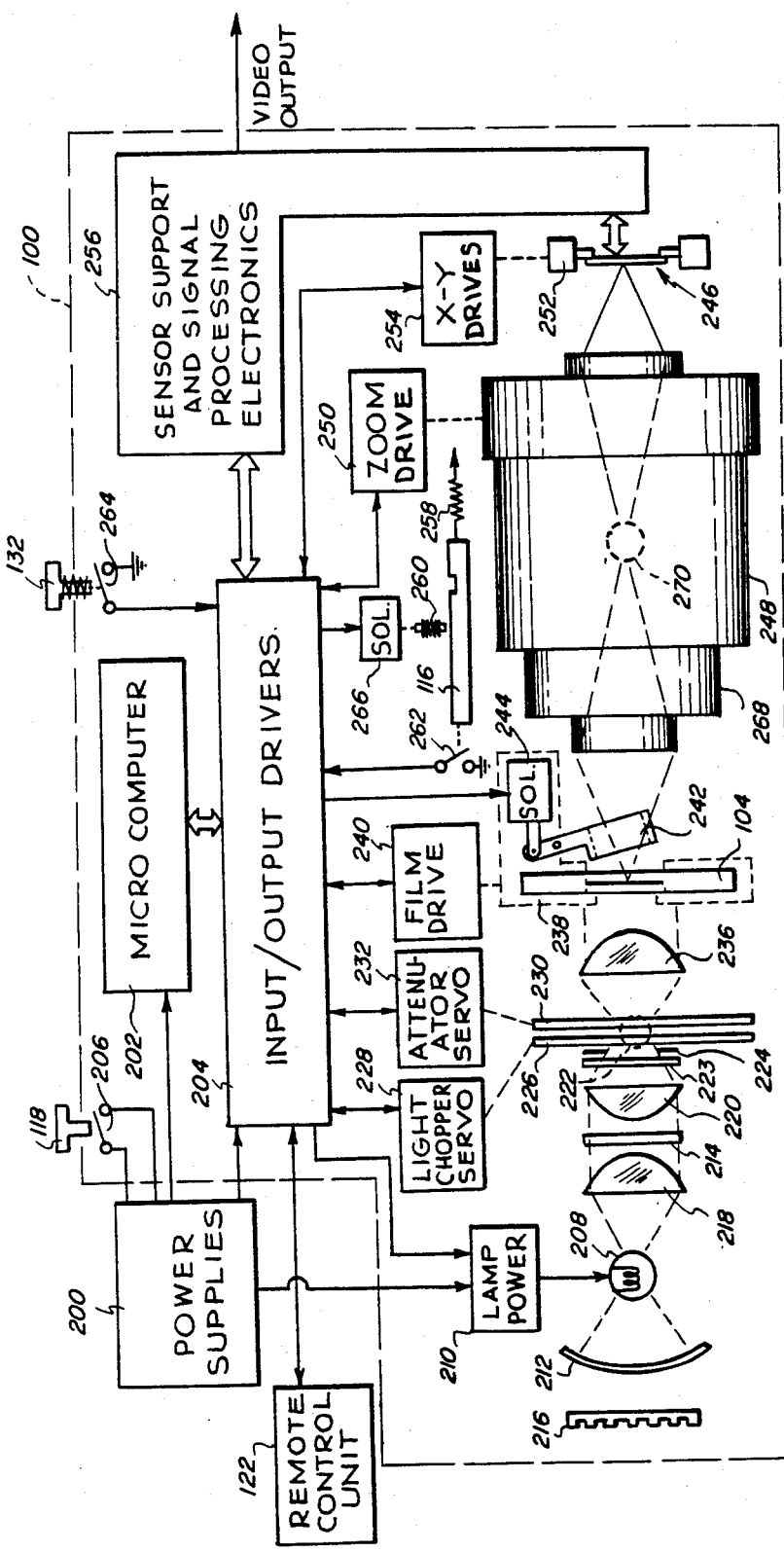
FIG. 2 is an overall schematic block diagram of the video player shown in FIG. 1.

An overall schematic diagram of the video player 100 is shown in FIG. 2. The video player is powered by power supplies 200 and is controlled by a programmed microcomputer 202 via input, output driver circuits 204. On/off button 118 actuates a main power switch 206 connected to the power supplies 200.

Light for illuminating the film is generated by a high intensity lamp 208 powered by a lamp power supply 210. Infrared light from the lamp is removed from the main optical path by a cold mirror 212 and a hot mirror 214. Infrared light passed by the cold mirror is absorbed by a heat sink 216 to protect the cabinet from localized overheating. The light from the lamp is imaged by condenser lenses 218 and 220 into a focal region 222, where the light is slightly diffused, masked, chopped, and attenuated. A weak diffuser 223 improves the uniformity of illumination across the film gate. A mask 224 limits the apparent size of the source and reduces the off axis flare light from the light source 208. The light is chopped at the video field rate by a rotating aperture disc 226 driven by a light chopper servo 228. The intensity of the light flashes produced by the chopper disc is controlled by a variable attenuator 230 driven by an attenuator servo 232. The chopped and attenuated light is collimated by a condenser lens 236 onto a film handling station 238.

A film disc in its packette 104 is located in the film handling station 238. The film handling station 238 includes a film drive 240 for locating and advancing film frames in the video player. The film handling station 238 also includes a movable film gate 242 that is actuated by a solenoid 244. An image of the illuminated film frame is projected onto a solid state color image sensor 246 by a zoom lens 248. The magnification of the image on the solid state image sensor 246 is controlled by a zoom drive 250.

The solid state color image sensor 246 is carried by an X-Y translation stage 252 that is driven by X-Y drives 254. Signals for operating the solid state color image sensor 246 are supplied by sensor support and signal processing electronics 256. The signal processing electronics also receive the photosignals generated by the solid state image sensor 246 and generate the color video signals therefrom.

Film gate door 116 is held in its closed position, against the urging of a bias spring 258, by a spring loaded latch 260. When in its closed position, film gate door 116 engages a sensor switch 262 to signal the microcomputer that the door is closed.

When the eject button 132 is depressed, a switch 264 is closed to signal the computer. The computer releases latch 260 by activating a solenoid 266 coupled to latch 260.

II. Optical System

The optical system of the color film video player provides a light source for uniformly illuminating the film gate with sufficient intensity so that a complete exposure of the solid state color image sensor 246 may be effected in the vertical retrace interval of a standard color television signal. The light source optics provide locations for a filter pack, a chopper, an attenuator, a mask, and a weak diffuser in the light path. The light source is capable of producing a range of intensities for properly illuminating films having intensities ranging over four and one half stops (one and a half stops under exposed to three stops overexposed) and at magnification from 1:1 to 2:1.

The image forming portion of the optical system projects an image of the film gate onto the solid state color image sensor at magnifications adjustable between normal magnification where the image just fills the display and a predetermined maximum where the quality of the display is limited substantially by the resolution of the film. The field of view of the image forming optics is sufficiently wide such that the solid state color image sensor may be moved to a far corner of an image projected at maximum magnification, without experiencing objectionable vignetting.

Referring to FIG. 2, light for the optical system is provided by a quartz halogen lamp having filament dimensions of approximately 2.5 mm×2.5 mm. A cold mirror 212 is 2 mm thick with a radius of curvature of approximately 30 mm. The cold mirror approximately doubles the apparent useful intensity of the light source 208 by passing the infrared portion of the spectrum, and reflecting the visible portion of the spectrum to form a real image of the lamp filament adjacent the actual filament. A pair of aspheric condenser lenses 218 and 220 having 18 mm focal lengths, form a real image 222 of the lamp (and its reflection from the cold mirror) at a location suitable for chopping the light. A dichroic filter pack 214, measuring approximately 25 mm×25 mm, containing a hot mirror for reflecting infrared radiation and for passing visible light, and color correction filters for further adjusting the color balance of the light, is located between the two condenser lenses 218 and 220. A weak diffuser 223 improves the uniformity of illumination across the film gate. A mask 224 located at image location 222 limits the size of the source image. Light chopper 226 comprising a rotating apertured disc interrupts the light beam and passes periodic pulses of light in synchronism with the vertical retrace period of a standard television signal. Light attenuator 230 is a variable neutral density filter having a density range of 0 to 2.0 neutral density units. The light attenuator is servo driven for adjusting the apparent intensity of the light source. A final aspheric condenser lens 236 partially collimates the light onto the film gate 242.

Alternatively, the pulsed light source may comprise an electronic strobe light, such as a Xenon flash lamp synchronized to the vertical retrace interval of the video output signal.

The image forming optics include a first lens group 268, comprising a Nikon, Series E 50 mm, F1.8 Camera Lens, arranged with the camera side toward the film gate. The first lens group forms a real image 270 of the light source, and causes the film gate to appear at infinity. A second lens group 248, comprising a Tamaron SP Zoom Lens 35 mm to 80 mm, F2.8 to 3.8, forms an image of the film gate on the solid state image sensor 246. The magnification of the image is continuously variable. The zoom lens 248 is arranged with its camera side toward the solid state image sensor and is positioned such that the image 270 of the light source formed by the first lens group 268 falls on the aperture stop of the zoom lens, so that the quantity of light passing through the zoom lens is not further effected by changes in magnification. The fields of view of the lenses 268 and 248 are sufficiently large such that the image sensor can be displaced to a corner of the maximally enlarged image without objectionable vignetting.

III. Image Sensor

The solid state color image sensor according to the present invention, produces a color video signal at standard television resolution from color negative film. Since flash illumination during vertical retrace is employed, there is no need to transfer and store a frame of video information in a light shielded area during sensor readout. Furthermore, since the dynamic range of color negative film is limited to about 40 db, there is no need for antibloom protection in the image sensor. With negative film, the most important areas of the picture (the bright areas of the original scene) will occur in the darkest areas of the negative (low signal areas). For this reason, the conventional definition of signal-to-noise ratio for a video camera does not apply to the image sensor for film video player for color negative film, and a new definition of signal-to-noise ratio is required to emphasize the importance of high signal-to-noise ratio in the low signal regions of the operating response of the sensor. Since charge coupled devices (CCD's) have lower noise at low output levels than X-Y addressed arrays, the image sensor according to the preferred embodiment of the present invention is a CCD.

Figure 3:
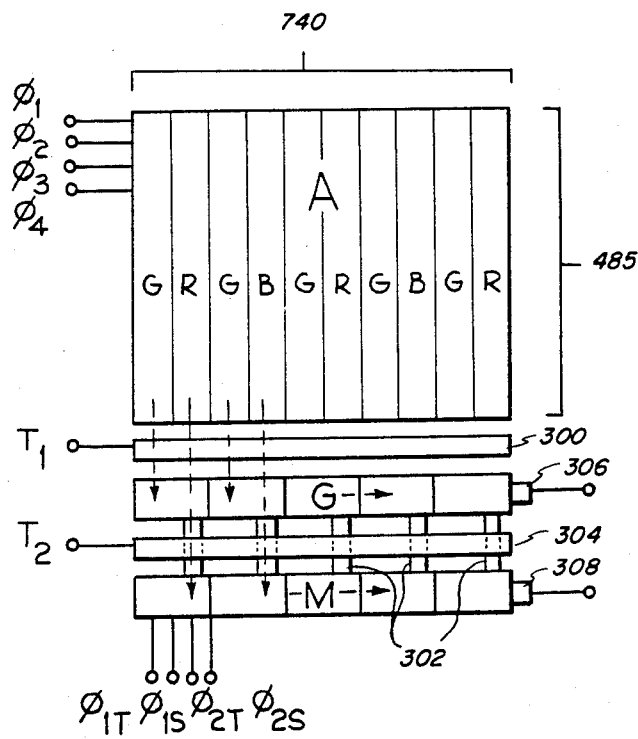
FIG. 3 is a schematic diagram of a single frame CCD image sensor according to the present invention employed in the video player.

The overall configuration of the CCD image sensor for the video player is shown in FIG. 3. The image sensor comprises a single frame, four-phase buried channel CCD. The image is sensed in a two-dimensional array (A) having 740 vertical columns and 485 horizontal rows. The image sensor array is provided with a vertically striped color filter array to render all the odd numbered columns sensitive to green light, and alternate even numbered columns sensitive to red and blue light respectively. After exposure, four-phase clock signals $\phi_{1-4}$ are applied to the image sensing array A to move the imagewise charge pattern formed therein one row at a time, to the output registers. Normally, a 14 MHz clock would be required for reading out rows of image sensors having 740 elements per row at a standard television line rate. To reduce the required clocking rate by half, a pair of parallel output registers G and M are employed. The output registers are four-phase CCD shift registers. Each cell of the output registers includes two transfer electrodes 1T and 2T and two storage electrodes 1S and 2S. A first transfer gate 300 actuated by a first transfer signal $T_1$ transfers a row of photocharges to output register G. The cell pitch in output registers G and M is twice the width of the columns in image sensing array A. Each cell of the output registers is associated with an odd and an even column of the image sensing array. The odd columns are aligned with the 1S electrodes, and the even columns with the 2S electrodes. The 2S electrodes of the output registers G and M are connected by buried channels 302. These channels are controlled by a second transfer gate 304. When a row of photocharges is read out of image sensing array A, the photosignals from odd columns (representing the green information) are transferred into register G under the 1S electrodes. The photosignals from even columns (representing alternate red and blue information) are transferred through register G into register M under the 2S electrodes.

After a row of photocharges has been transferred to the output registers G and M, transfer gates 300 and 304 are closed, and the output registers are operated in a pseudo two-phase manner by clocking the 1T and 1S electrodes in phase and the 2T and 2S electrodes in phase to transfer the photocharges serially to output diodes 306 and 308 respectively.

Figure 4:
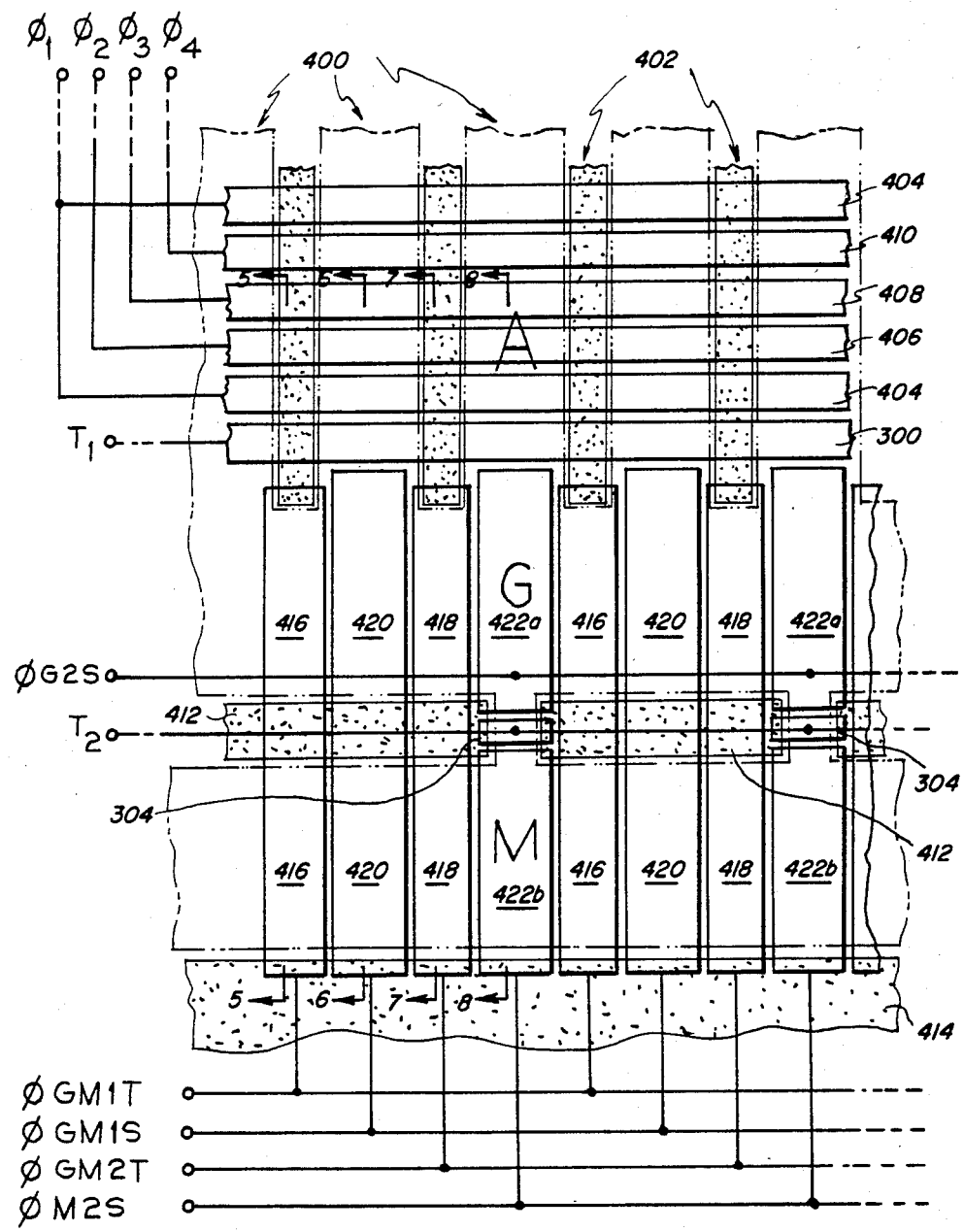
FIG. 4 is a partial plan view showing the electrode configuration of the single frame image sensor according to the present invention in the area of the readout registers.

A partial plan view of the electrode structure of the solid state image sensor is shown in FIG. 4. The device is constructed on a doped semiconductor substrate (e.g. p-type silicon). Channel stopping regions shown by stippled areas are defined by a more heavy doping (e.g. p+) covered by a thickened field oxide. The thickened field oxide of the channel stop is employed as a mask to ion implant the buried channel regions outlined by chain lines, (e.g. n-type dopant). The image sensing array A is defined by vertical channels 400 separated by channel stopping regions 402 and overlayed with four-phase transfer electrodes 404, 406, 408 and 410.

The channels of output registers G and M are separated by channel stopping regions 412 and the outside edge of the channel for register M is defined by channel stopping region 414. The gaps between channel stopping regions 412 provide the buried channel connections between output registers G and M beneath the 2S electrodes.

A first transfer gate 300 separates register G from the image sensing array A, and a second transfer gate 304 separates register G from register M. Each cell of output registers G and M is defined by two transfer electrodes 1T and 2T (416 and 418 respectively) and two storage electrodes 1S and 2S (420 and 422$a$ and $b$ respectively). The 1T, 2T and 1S electrodes are continuous across both shift registers G and M. The 2S electrodes 422$_a$ and 422$_b$ are separately addressable. The phase-one and phase-three electrodes of the image sensing array A and the 1S and 2S electrodes of the shift registers G and M are patterned from a first level of polysilicon. The phase-two and phase-four electrodes of the image sensing array A, the 1T and 2T electrodes of the shift registers G and M, and the first and second transfer gates are patterned from a second level of polysilicon.

Figure 5:
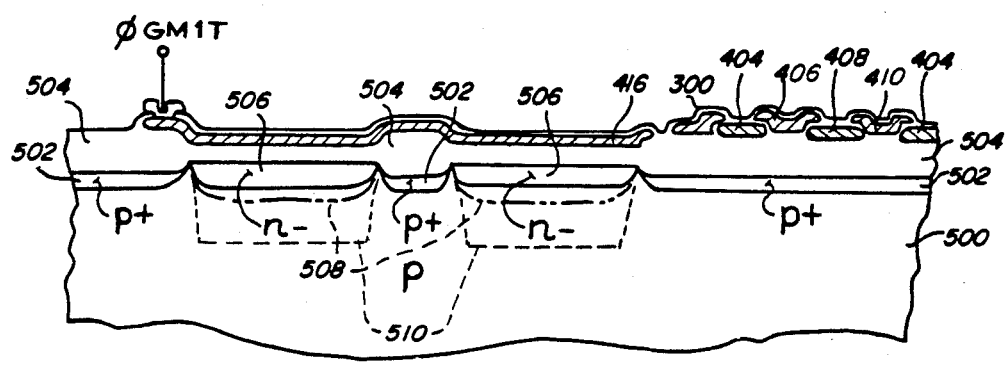
FIGS. 5–8 are cross-sectional views taken along lines 5—5, 6—6, 7—7, and 8—8 respectively in FIG. 4, showing the electrode structure and channel potentials of the single frame image sensor according to the present invention.
Figure 6:
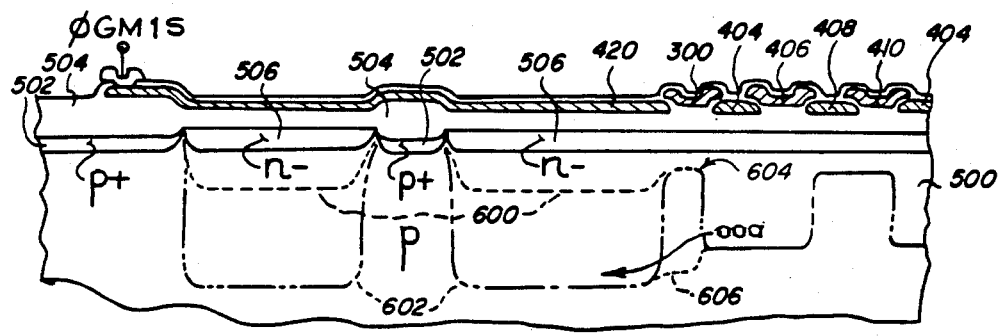
Figure 7:
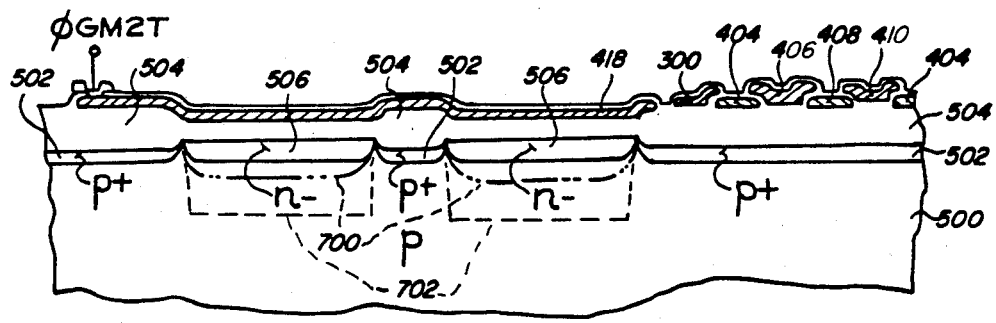

FIGS. 5, 6, 7 and 8 show cross sections of the image sensor taken along lines 5—5, 6—6, 7—7, and 8—8 in FIG. 4 respectively. As shown in these cross sections, the image sensor is constructed on a p-type substrate 500. The channel stopping regions comprise a p+-type doped layer 502 and a thickened field oxide 504. The buried channels comprise n-type implanted regions 506. FIG. 5 is a cross section through a 1T electrode 416. When the clock signal $\phi$GM1T applied to the 1T electrode 416 is low, the potential well under the 1T electrode is collapsed, as shown by chain lines 508 in FIG. 5. When the clock signal $\phi$GM1T is high, potential wells are formed in the buried channel under the 1T electrode, as shown by dashed lines 510. Similarly, as shown in FIG. 7, when the clock signal $\phi$GM2T is low, the potential well under the 2T electrode 418 is collapsed (as shown in chain lines 700) and when $\phi$GM2T is high, a potential well is formed thereunder (as shown by dashed lines 702). Referring now to FIG. 6, when the clock signal $\phi$GM1S applied to the 1S electrode 420 is low, the potential well thereunder is collapsed, as shown by dashed lines 600. When $\phi$GM1S is high, potential wells are formed in the G and M shift registers, as shown by chain lines 602. When the signal $T_1$ applied to the first transfer gate 300 is low, a potential barrier 604 is formed between the image sensing array and the output shift register. The potential barrier is lowered when $T_1$ goes high (as shown by dashed line 606) and signal charge waiting in the odd columns of the bottom row of the image sensing array A is allowed to flow into the output shift registers.

Figure 8:
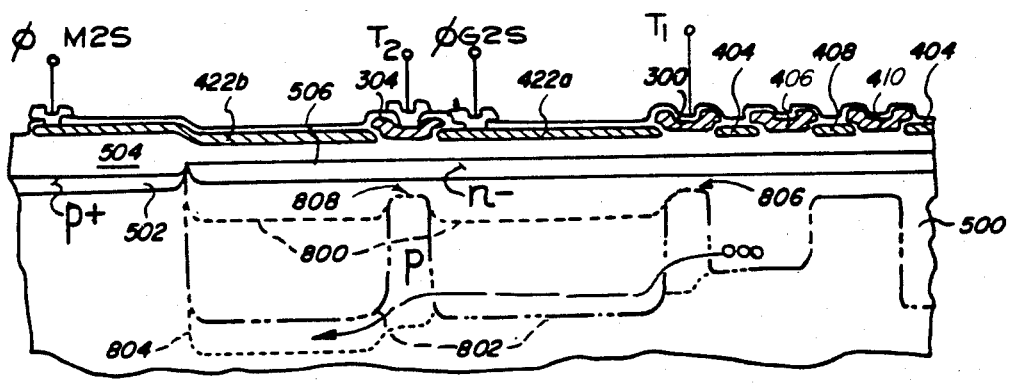

FIG. 8 illustrates the potential wells formed under the 2S electrodes 422 $a$ and $b$. When $\phi$M2S or $\phi$G2S is low, the potential well under the respective electrode is collapsed, as shown by dashed lines 800. A potential well, as shown by chain line 802, is formed under the 2S electrodes when $\phi$M2S or $\phi$G2S are high. Optionally, to improve signal transfer, an even higher voltage is applied to 2S electrode 422 $b$, the potential well thereunder is further deepened as shown by dashed line 804. When the control signals $T_1$ and $T_2$ applied to the first and second transfer gates are low, potential barriers 806 and 808 are formed beneath the respective transfer gates. The potential barriers 806 and 808 collapse when the $T_1$ and $T_2$ signals are high, allowing signal charge to flow from the even columns of the last row of the image sensing array A into the M register.

Figure 9:
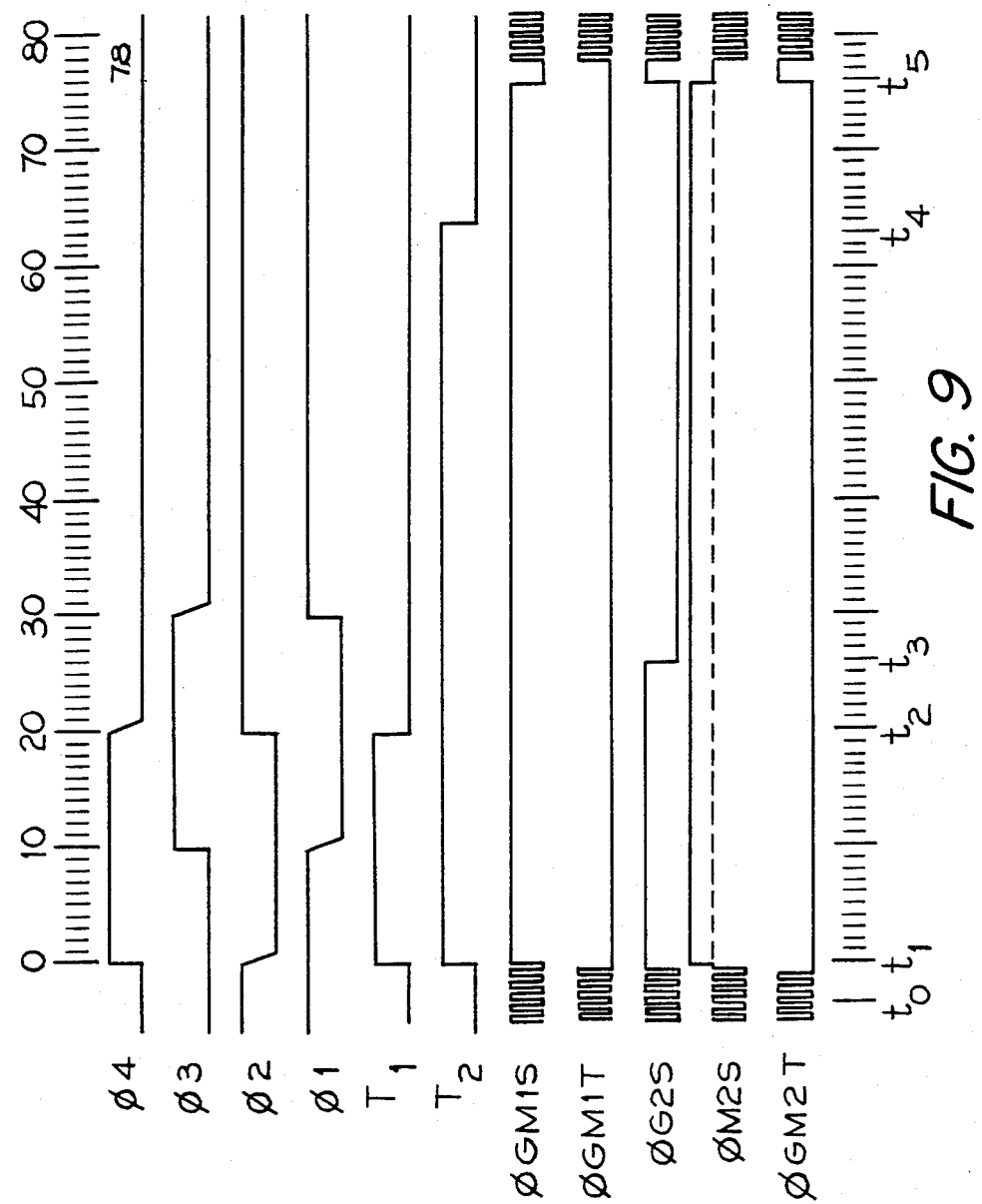
FIG. 9 is a timing diagram for describing the operation of the image sensor according to the present invention.

FIG. 9 is a timing diagram showing the control signal timing sequence for transferring a row of photocharge from the image sensing array A to the output registers G and M. At time $t_o$, the signal charge resides under the last phase-one electrode 404 and phase-two electrode 406 in the odd and even columns of the image sensing array A, as shown in FIGS. 6 and 8 respectively. At time $t_1$, the potential wells under the 1T and 2T electrodes are collapsed (e.g. $\phi$GM1T and $\phi$GM2T low), as shown by chain lines 508 and 700 in FIGS. 5 and 7. The potential wells under the 1S and 2S electrodes are formed (φGM1S, φG2S, and φM2S high) as shown by chain lines 602 and 802 and FIGS. 6 and 8. Optionally, shortly thereafter, φM2S is raised even higher, as shown by the solid line φM2S in FIG. 9, and the potential well under the M2S electrode 422$_b$ is deepened, as shown by dashed line 804 in FIG. 8. The first and second transfer gates 300 and 304 are actuated to lower the potential barriers 604, 806, and 808 as shown in FIGS. 6, and 8 (T$_1$ and T$_2$ high).

Signal charges from the odd columns of image sensing array A flow into the G register under the 1S electrodes 420. Signal charges from the even columns of array A flow through the G register into the M register under the 2S electrodes 422$a$ and b.

At time t$_2$, the potential barrier under the first transfer gate is raised, then at time t$_3$, the potential well under the G2S electrode is collapsed, thereby moving all the charge from the even columns into the M register.

At time t$_4$, the potential barrier 808 (see FIG. 8) between the G and M registers is raised by dropping the voltage T$_2$ on the second transfer gate 304. At time t$_5$, the potential well under the G2S electrode 422$a$ (see FIG. 8) is reestablished. The potential under the 2T electrode 418 is lowered to the level 702 as shown in FIG. 7, and the potential well under the 1S electrode 420 (see FIG. 6) is collapsed to the level 602, thus advancing the charges in the G register by one-half cell. From this point on, the shift registers are read out simultaneously by clocking the G and M shift registers in a pseudo two-phase mode.

Figure 10:
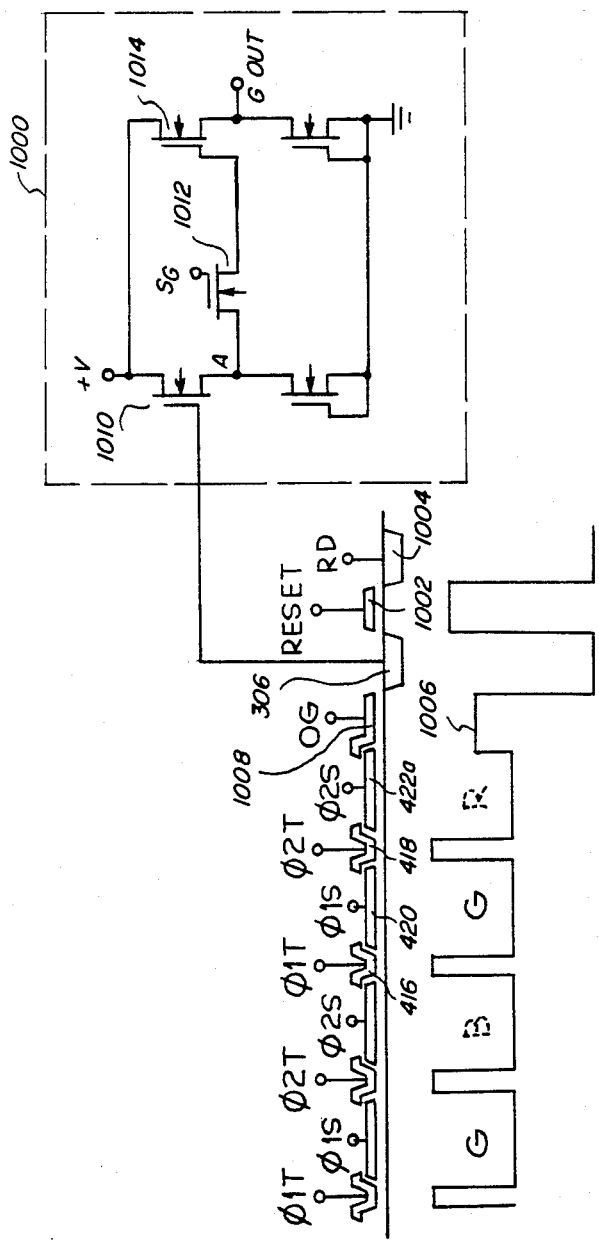
FIG. 10 is a schematic diagram of a portion near the output gate and the output amplifier of one of the output registers.

A schematic cross section of the output portion of the G register is shown in FIG. 10. The output circuit 1000 is a standard double buffered, sense and reset-type amplifier, either integrated on the chip, or located off the chip. The potential profile under the electrode structure illustrates the configuration of the potential well in the G register during transfer of one row of photocharges from the array A. The wells under the 1S electrodes contain photocharges representing green information. The wells under the 2S electrodes are marked with B and R in phantom to illustrate that photocharges representing blue and red have passed through these wells on their way to the M register.

During readout of the G shift register, a photocharge representing green information is shifted to a position beneath the final 2S electrode 422$a$. The output diode 306 is reset by applying a RESET pulse to a reset gate 1002, which returns the potential of the output diode to a fixed reference potential RD supplied to a reset diode 1004. The "green" photocharge is then transferred to the output diode 306 over a potential barrier 1006 formed by a fixed voltage OG applied to an output gate 1008. The resulting change in potential on the output diode is applied to the gate of a first stage FET amplifier 1010. The output of the FET amplifier, at node A is sampled by applying a sample pulse S$_G$ to the gate of a sample FET 1012, which applies the sampled voltage to the gate of a second stage FET amplifier 1014. The resulting output signal G$_{OUT}$ forms the "green" channel of the color video signal. The previous steps are repeated at the 7 MHz video sampling rate till readout of the G register is complete.

Figure 11:
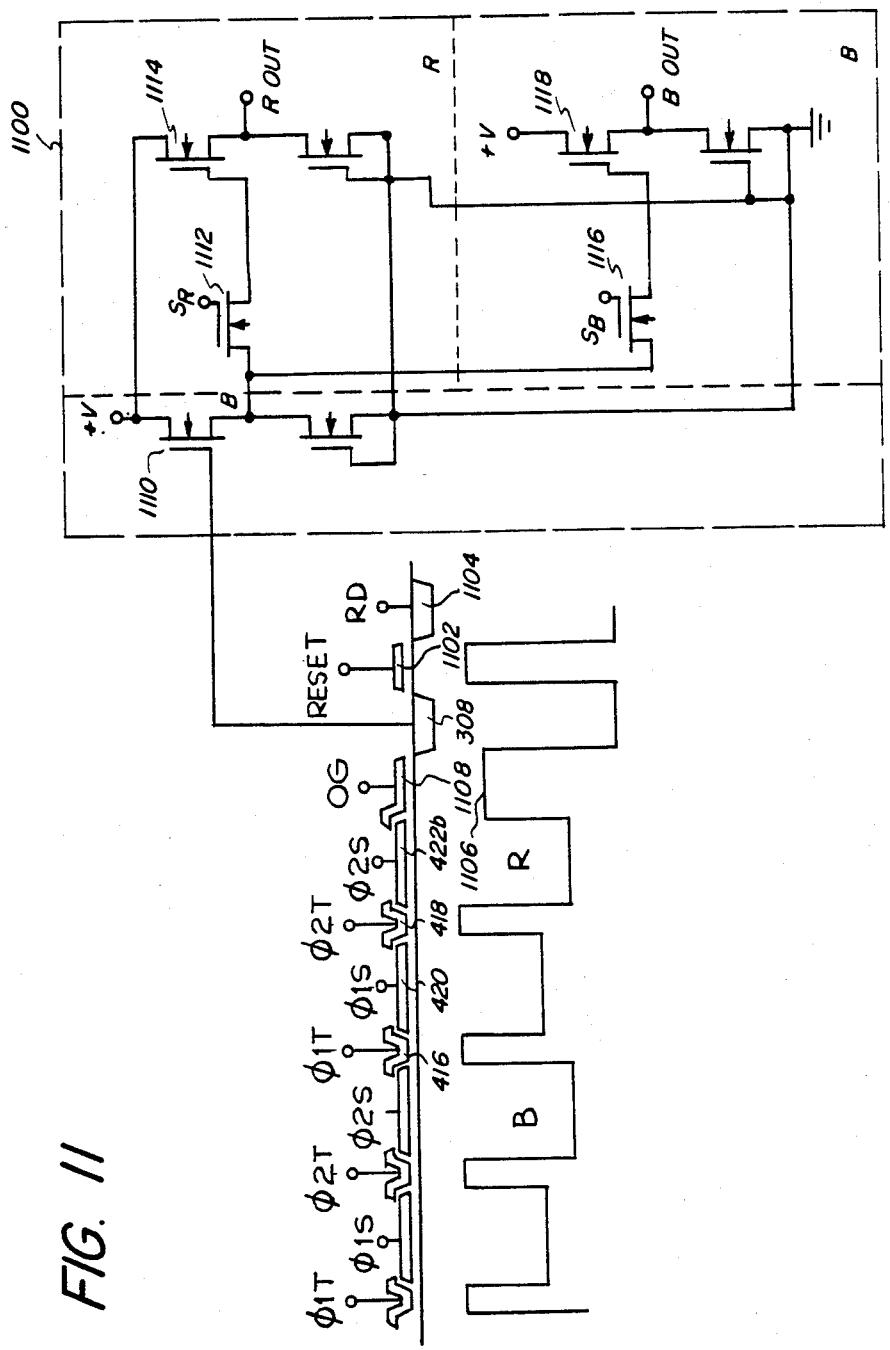
FIG. 11 is a schematic diagram of a portion near the output gate and the output amplifier and demultiplexer of the other output register.

FIG. 11 is a schematic cross section of the output portion of the M shift register. The output amplifier 1100 is a double buffered, sense and reset-amplifier having a single first stage and two identical second stages R and B. The output amplifier also serves as a demultiplexer to separate the blue and red signals depending upon which stage is activated, the blue signals are produced from the B stage and the red signals are produced from the R stage.

During readout of the M shift register, a photocharge (representing, for example, red information) is shifted to a position beneath the final 2S electrode 422$b$. The output diode 308 is reset by applying a RESET pulse to a reset gate 1102, which returns the potential of the output diode to a fixed reference potential RD supplied to a reset diode 1104. The "red" photocharge is then transferred to the output diode 308 over a potential barrier 1106 formed by a fixed voltage OG supplied to an output gate 1108. The resulting change in potential on the output diode 308 is applied to the gate of a first stage FET amplifier 1110. The output of the FET amplifier, at node B, is sampled by applying a sample pulse S$_R$ to the gate of a sample FET 1112, which applies the sampled voltage to the gate of a second stage FET amplifier 1114. The resulting output signal R$_{OUT}$ forms the "red" channel of the color video signal. The next photosignal (representing, for example, blue information) is treated in a manner similar to that described above, with the exception that the output at node B is sampled applying a sample pulse S$_B$ to a second sample FET 1116. The sampled signal is applied to the gate of a second stage FET amplifier 1118. The resulting output signal B$_{OUT}$ forms the "blue" channel of the color video signal. The readout continues in the manner described above, alternating between the "red" channel and the "blue" channel until readout of the M register is complete.

IV. Color Filter Array

The color filter array used to specularly sensitize the solid state color image sensor employs a vertical stripe pattern of transmissive color filters. Odd columns transmit green, and the alternate even columns transmit red and blue portions of the spectrum. Preferably, the color filter array is fabricated directly on the sensor itself. Alternatively, the color filters may be made on a quartz substrate, and attached to the sensors with UV curable optical cement, after alignment.

Figure 12:
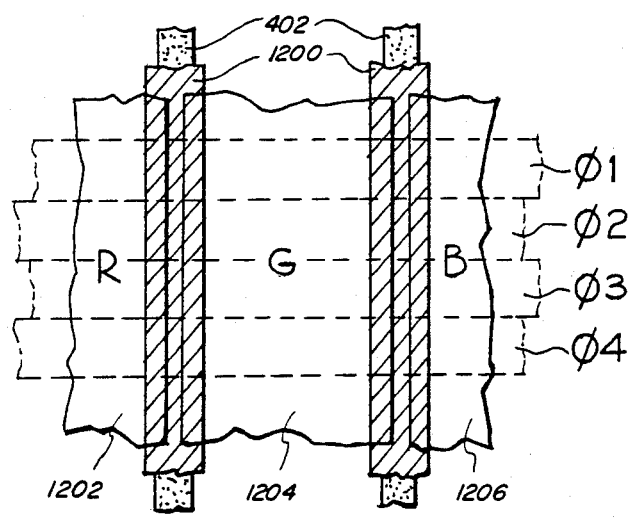
FIG. 12 is a partial plan view illustrating the integral color filter array on the image sensor according to the present invention.

FIG. 3 showed the alternating color stripe pattern on the image sensor. FIG. 12 is a partial schematic diagram showing in more detail the placement of the color filter stripes on the vertical columns of the image sensing array. Aluminum light shields 1200 are placed over the vertical channel stops 402 to provide some tolerance for alignment of the color filter array. The R, G, and B color filter stripes 1202, 1204, and 1206 respectively are each approximately 12 microns wide. Each photosensitive element in the array, defined in width by the distance between the aluminum light shields and in height by one full set of four-phase transfer electrodes $\phi_{1-4}$ is approximately 12×27 microns.

Figure 13:
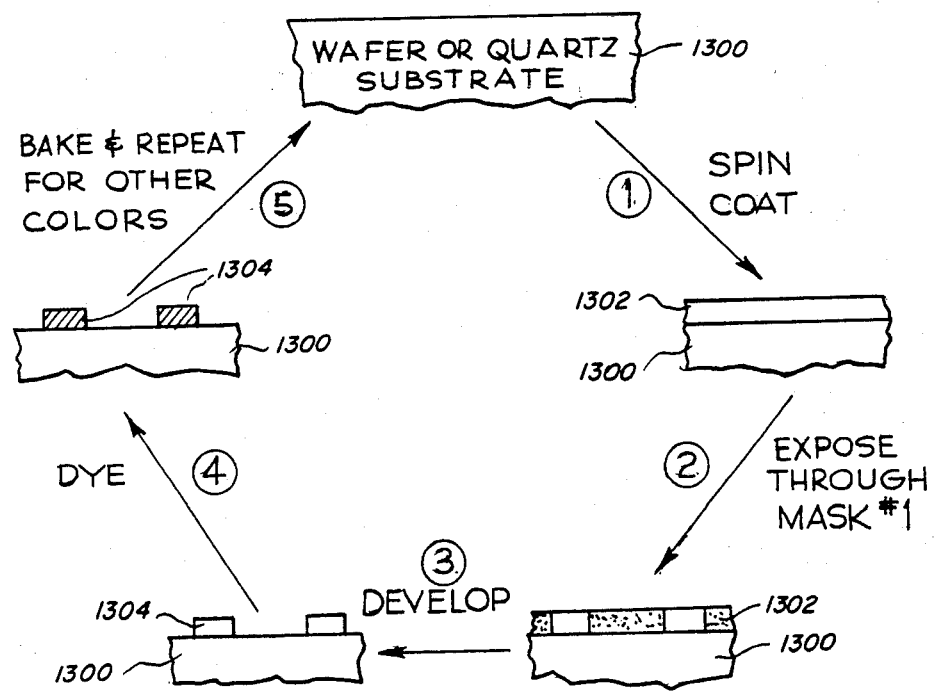
FIG. 13 is a schematic diagram illustrating the method of manufacturing the color filter array.

FIG. 13 illustrates the process for fabricating the color filter array. Starting with a wafer bearing the fabricated image sensors, or a quartz substrate 1300, a layer 1302 of gelatin based photoresist is applied to the surface of the substrate by spin coating. Next, the photoresist layer 1302 is exposed through a mask to define the first set of color stripes. The photoresist is then developed to leave behind the first pattern of stripes 1304. The stripes are dyed in a hot bath (approximately 50° C.) of dye containing a surfactant to insure uniform surface wetting, to color the first set of stripes. The colored stripe pattern is baked at approximately 200° C. for approximately 45 minutes to harden the gel so that it resists further dyeing. The steps 1 through 5 are then repeated for the other color patterns to complete the color filter array.

V. Mechanical System

Figure 14:
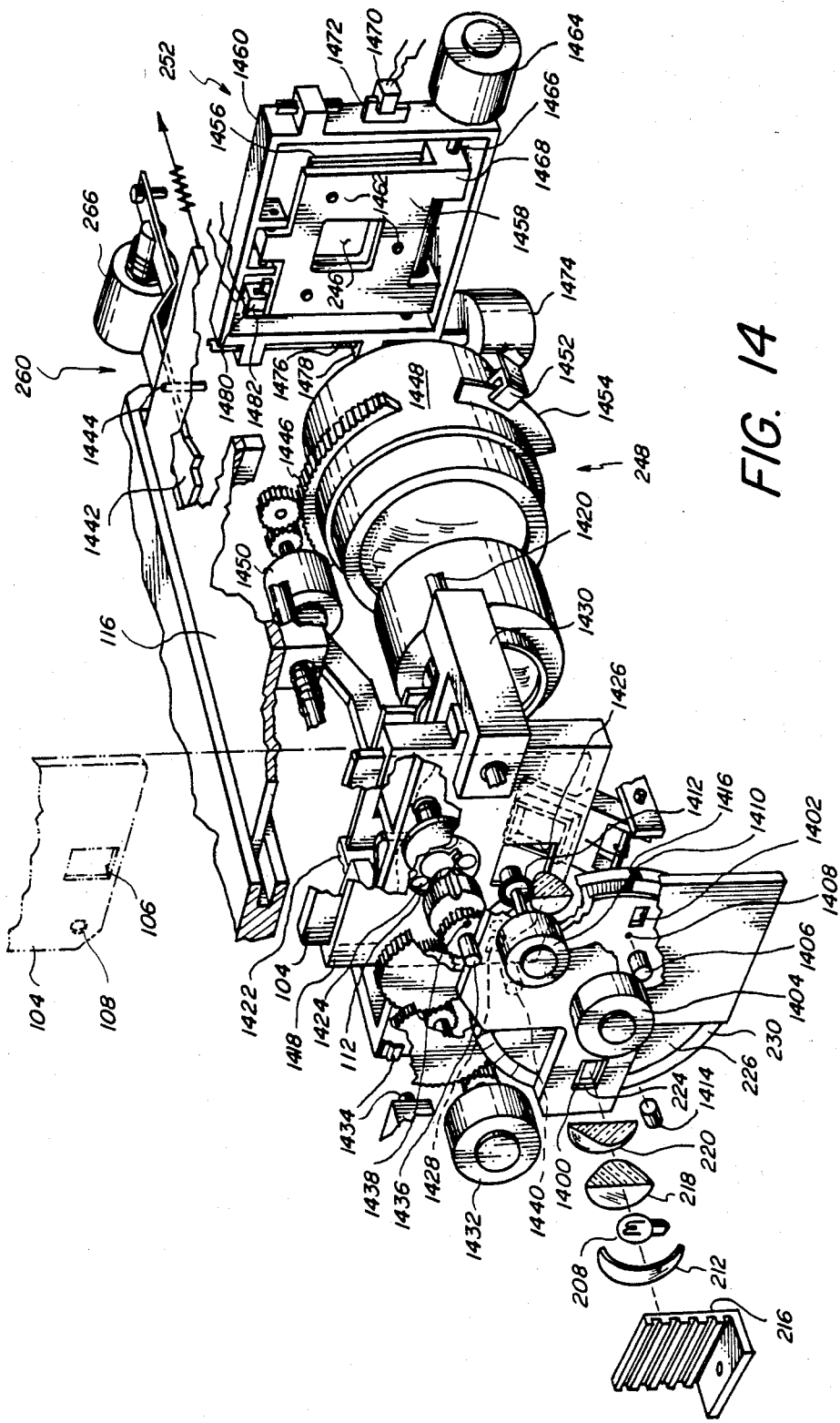
FIG. 14 is an overall mechanical perspective of the video player.

In addition to providing mechanical support and housing for the optics and electronics, the mechanical system of the film video player shown in FIG. 14 includes a light conditioning portion, a film handling station, a zoom optics portion, and a sensor transport stage.

The light conditioning portion comprises a mask 224, a light chopper disc 226 for providing intermittent illumination of the image sensor, and a variable light attenuator disc 230 for controlling the exposure of the image sensor. The light chopper disc 226 has two apertures 1400 and 1402 located 180° apart near the circumference of the disc. The light chopper disc is driven by a stepper motor 1404 to chop the light from lamp 208 at the video field rate. An electrooptical sensor 1406 senses timing marks 1408 to provide a chopper rate feedback signal to the light chopper servo. The timing marks 1408 are precisely aligned with the leading edges of the apertures for providing precise timing information.

The variable attenuator disc 230 comprising a neutral density wedge around the circumference of a transparent disc, is journaled concentrically with the light chopper disc 226 and is driven at its periphery by a stepper motor 1410 through a hockey puck drive 1412. An electrooptical sensor 1414 senses a mark 1416 on the edge of the variable attenuator disc 230 to signal the control electronics where the disc makes a transition from minimum to maximum attenuation.

The film handling station includes a packette locator 1418. The film packette 104 is received in the packette locator 1418 which is journaled to slide freely on a pair of rails 1420 and 1422. The packette locator includes a central aperture 1424 for access to the hub 112 of a film disc in the packette. A first peripheral aperture 1426 is provided for illuminating a frame of film in the film disc. A second peripheral aperture 1428 is provided in the packette locator for achieving access to the film alignment hole 108 in the packette. The packette locator is surrounded by a sliding yoke 1430 that is likewise journaled on rails 1420 and 1422.

Figure 15:
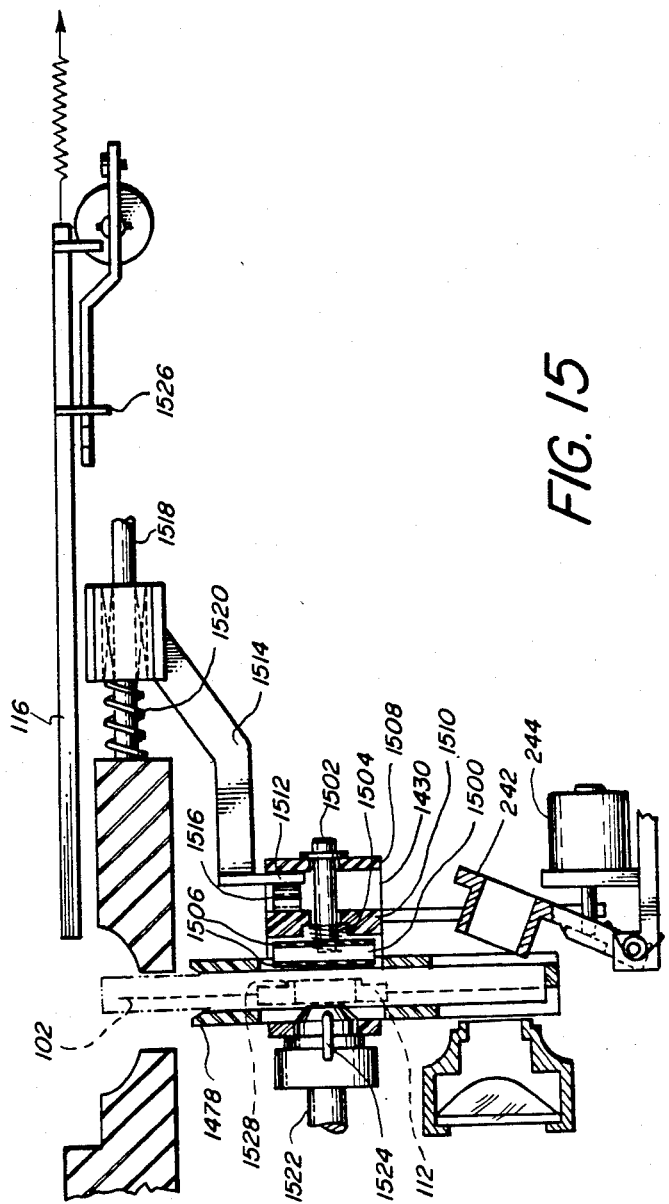
FIGS. 15 and 16 are cross-sectional views of the film handling portion of the video player, showing a film disc not seated, and seated, respectively on a film drive spindle.

FIG. 15 shows a cross sectional side view of the film handling station. Sliding yoke 1430 carries a disc brake 1500 mounted on an axle 1502. The disc brake is normally free to rotate on its axle and is urged by a spring 1504 toward the left with respect to the yoke 1430 (as seen in FIG. 15). The brake is lined on its front and back surfaces with a high friction elastomeric material 1506.

Sliding yoke 1430 includes a pair of walls 1508 and 1510. A fork 1512, carried by an arm 1514 is interposed between the walls 1508 and 1510 and is urged into contact with wall 1508 by a leaf spring 1516. Arm 1514 is journaled to slide on a rail 1518 and urged toward the right (as seen in FIG. 15) by a spring 1520. When film door 116 is opened, as shown in FIG. 15, fork 1512 urges sliding yoke 1430 to the right into stops (not shown) on the rails. Sliding yoke 1430 in turn urges packette locator 1418 to the right.

Located adjacent the central aperture in the packette locator is a film drive spindle 1522 having a key 1524. The film drive spindle is adapted to engage the keyed hub 112 of a film disc 102 in the packette and is driven by a motor 1432 (see FIG. 14) through a gear train for rotating the film disc. The film drive spindle is fixed axially with respect to the video player, and the hub 112 is urged onto the spindle by sliding the packette locator 1418 to the left as seen in FIG. 15.

When film door 116 is moved to the left, a blade 1526 carried by the film door 116 engages the journal on arm 1514 and moves the arm to the left. As arm 1514 moves to the left, fork 1512 pushes sliding yoke 1430 to the left via leaf spring 1516, carrying disc brake 1500 into contact with a raised rim 1528 on hub 112 of the film disc. Pressure of the disc brake 1500 against the hub 112 causes packette locator 1418 to slide to the left, till the hub encounters the film drive spindle 1522. Assuming that the key 1524 in the film drive spindle and the key way in the hub are not in alignment, further motion of the hub and the packette locator will be arrested. As the arm 1514 continues to move to the left, spring 1504 is compressed and wall 1510 is brought into contact with the back side of the disc brake 1500, thereby clamping the hub to prevent it from further rotation. Further movement of arm 1514 to the left compresses leaf spring 1516 slightly.

When the film drive motor is actuated, spindle 1522 rotates with respect to hub 112 till the key 1524 engages the keyway in the hub. At this point, springs 1504 and 1516 urge the hub fully onto the spindle. Sliding yoke 1430 moves slightly to the left thereby closing the contacts of a "film seated" sensor switch 1434 (see FIG. 14) to indicate to the computer that the hub has seated on the spindle. The back side of disc brake 1500 moves slightly away from wall 1510 thereby allowing the hub and/or the disc brake to rotate freely.

An electrooptical sensor 1436 senses an indicator mark 1438 on the gear train that drives the film drive spindle 1522 (see FIG. 14). The signal from the electrooptical sensor is employed by the control electronics to locate coarsely the first frame of the film disc. An electrooptical sensor 1440 is positioned with respect to aperture 1428 in the packette locator for finely positioning a frame in the film gate.

The film door 116 is held shut by latch 260 comprising a pivotally mounted latch arm 1442, which cooperates with a pin 1444 on the sliding door 116. Solenoid 266 connected to latch arm 1442 is actuable for retracting the latch arm to release the latch.

Figure 16:
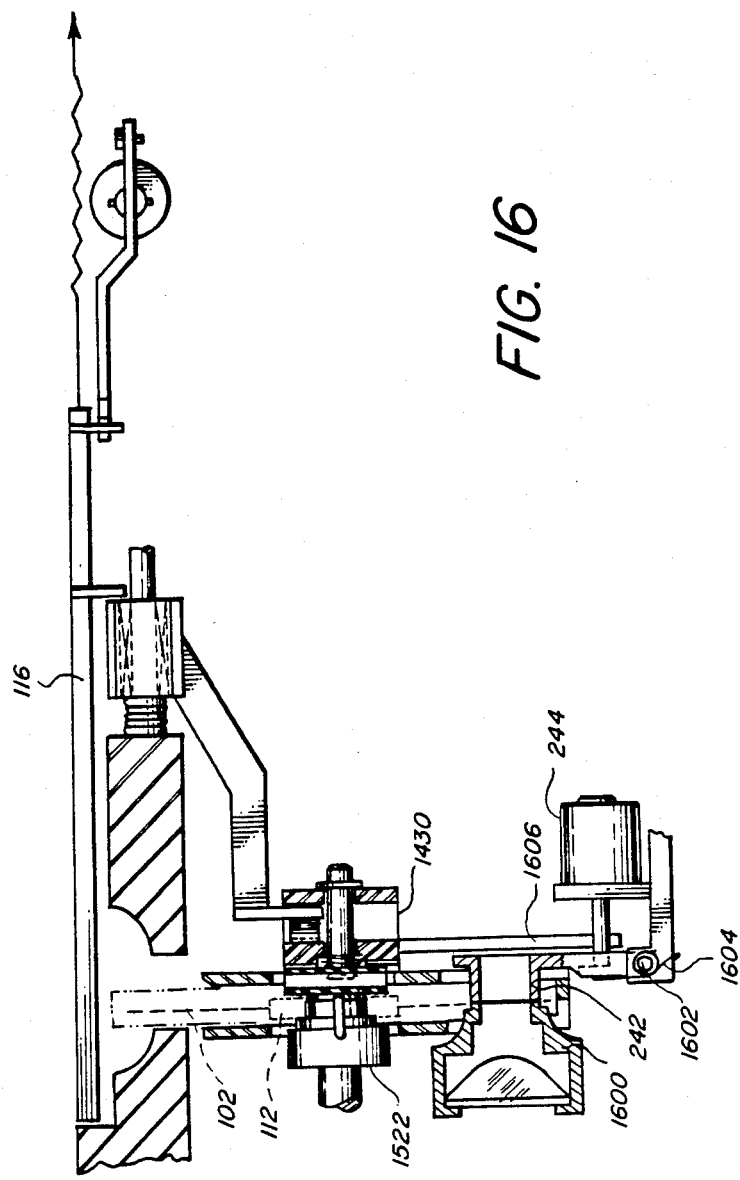

FIG. 16 is a schematic cross section of the film transport portion of the video player showing the sliding door 116 closed and latched, and the hub 112 of the film disc 102 located on the film drive spindle 1522. The film disc 102 (shown in phantom) is directly adjacent a fixed half 1600 of the film gate. The other half of the film gate 242 swings on a hinge 1602 and is urged in a direction away from the fixed half of the film gate by a spring 1604. Sliding yoke 1430 carries an arm 1606 that contacts the movable half of the film gate 242 to swing the gate to a position very near the film when the sliding door 116 is closed. After a desired frame is located in the film gate by the film drive motor, solenoid 244 is actuated to urge the movable half of the film gate 242 into contact with the film, thereby firmly sandwiching the film between the fixed and movable portions of the film gate to maintain film flatness. The solenoid 244 is deenergized prior to each advance of the film to avoid scratching the film with the gate.

Referring now to FIG. 14, the zoom lens portion of the mechanical system will be described. The zoom lens 248 is adjusted by a sector gear 1446 attached to a rotatable portion 1448 of the zoom lens 248. The gear is driven through a gear train by a stepper motor 1450. An electrooptic sensor 1452 senses the end of a vane 1454 to generate a feedback signal indicating the normal magnification position of the zoom lens. The feedback signal is used by the computer to return the magnification of the displayed image to normal magnification after each frame advance.

The solid state image sensor 246 is mounted on a circuit card 1456 that is carried by an X-Y translation stage 252 having an X translating frame 1458 and a Y translating frame 1460. The circuit card 1456 is mounted on the X translating frame by three studs 1462 which are individually adjustable to position the image sensor in the focal plane of the zoom lens 248. The X translating frame 1458 is moved by a motor 1464 (mounted on the Y translating frame 1460) via a lead screw 1466 and a threaded block 1468. The center position of the X translating frame is sensed by an electrooptic sensor 1480 (mounted on the X translating frame) that senses a stepped vane 1482 carried by the X translating frame. The Y translating frame 1460 is moved by a stepper motor 1474 via a lead screw 1476 and a threaded block 1478. The center position of the Y translating frame is sensed by an electrooptic sensor 1470 that senses a stepped vane 1472 carried by the Y translating frame.

VI. Sensor Support Electronics

Figure 17:
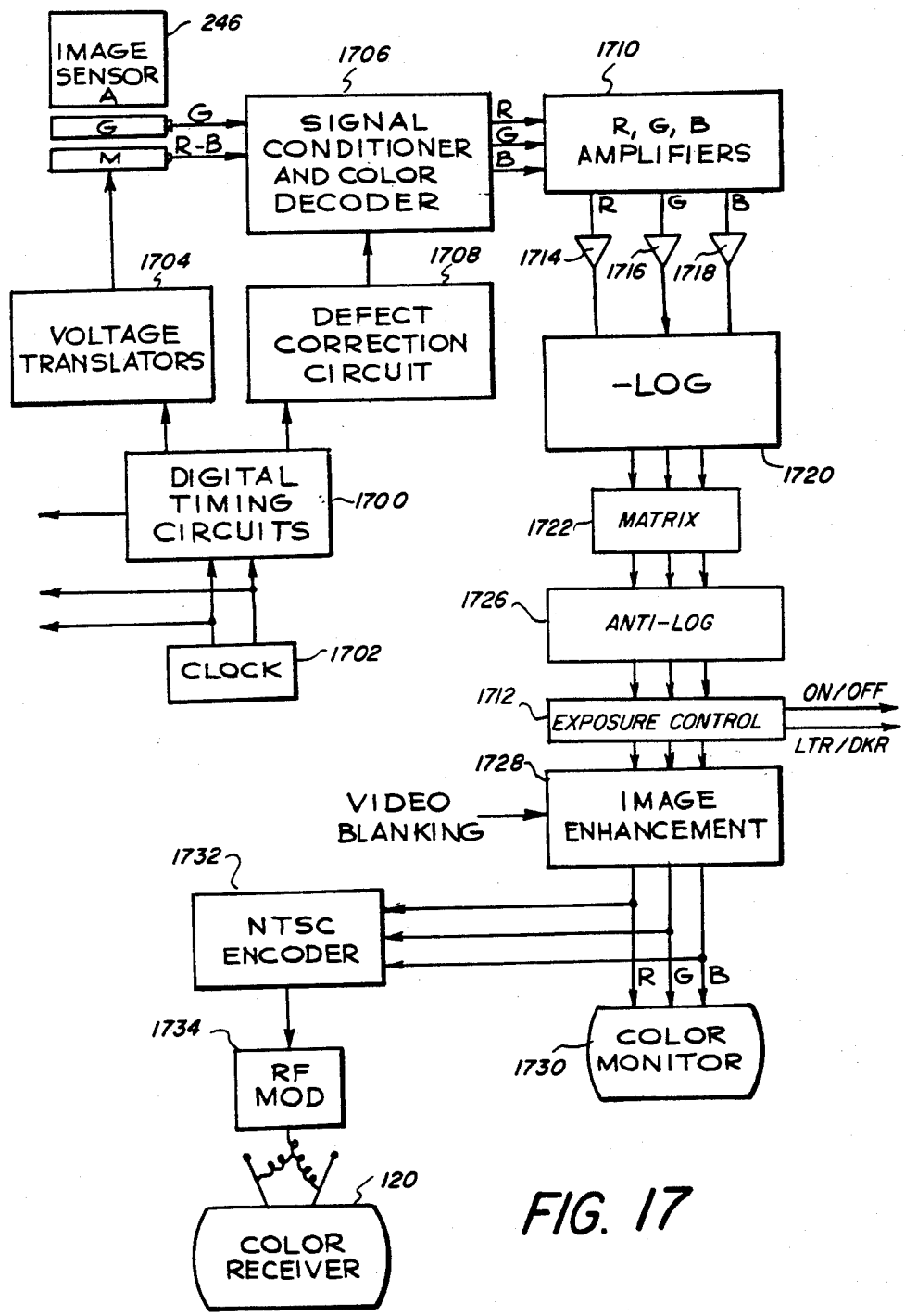
FIG. 17 is a schematic block diagram of the sensor support electronics of the video player.

The sensor support electronics shown in FIG. 17 include circuitry for generating the control signals for the solid state image sensor and for processing the signals generated by the image sensor. Digital timing circuits 1700 generate the signals for driving solid state image sensor 246 from master timing signals supplied by a master clock 1702. The signals are also supplied to the system control electronics for synchronizing overall system control with the operation of the solid state image sensor. The timing signals are amplified by a voltage translator 1704 and applied to the solid state image sensor 246. The output of the solid state image sensor from the G and M output registers, is detected and decoded by a signal conditioning and color decoder circuit 1706. A defect correction circuit 1708 is programmed with the location of defective columns in the sensor. When a defective column is present, the sample signal to the sample and hold circuit of signal conditioner and color decoder circuit 1706 is suppressed, thereby substituting a previous good sample in place of the defective sample.

The three color signals R, G, and B produced by the signal conditioner and color decoder circuit are amplified in amplifiers 1710.

The R, G and B signals are buffered by buffer amplifiers 1714, 1716, and 1718. The negative logs of the R, G, & B signals are taken by circuit 1720 to invert the signals and to convert from transmittance space to density space. The negative logs of the R, G and B signals are matrixed in matrix circuit 1722 to map the effective film exposures into color television light output. The antilogs of the resulting signals are taken by anti-log circuit 1726. The R, G, and B signals are sampled and a weighted average taken over one frame by exposure control circuit 1712 to develop an average luminance signal. The average luminance signal is sampled and held once per frame and is compared with a reference level to develope a two bit exposure control signal. The first bit of the exposure control signal indicates to the system control computer whether or not a light attenuator adjustment is required, and the second bit of the exposure control signal tells whether to make the exposure lighter or darker.

The R, G, and B signals are then cored in a video coring circuit 1728 to suppress film grain and crispen the edges in the scene. The coring circuit derives unsharp R, G, and B signals, using delay lines, that represent the average of a 3×3 pixel area. The unsharp signals are subtracted from their respective full bandwidth signals to yield high frequency R, G, and B detail signals. The detail signals are cored by removing the low amplitude excursions therefrom. The cored detail signals are amplified (to crispen edges) and added back to the unsharp signals. The resulting R, G and B signals are displayed directly on a color monitor 1730 or are encoded and modulated for display on a standard television receiver 120 by a standard NTSC encoder 1732 and an RF modulator 1734.

During frame selection, the video signal is blanked by a video blanking signal from the microprocessor.

VII. System Control Electronics

Figure 18:
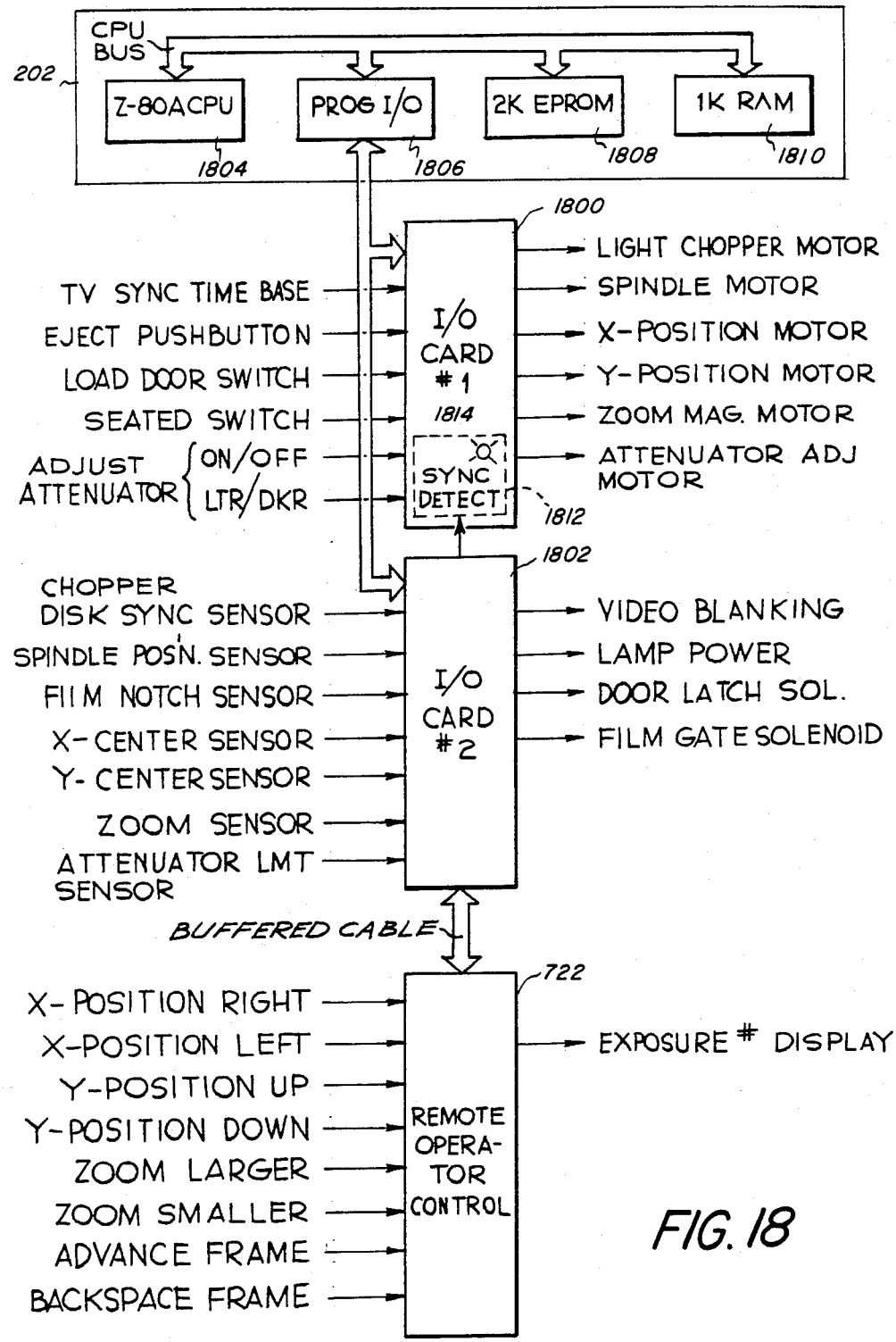
FIG. 18 is a schematic block diagram of the system control electronics of the video player.

The system control electronics, shown in block diagram in FIG. 18, comprises a microcomputer 202 on a single circuit card, and a plurality of input/output drivers on two other circuit cards 1800 and 1802. The microcomputer, based on the Z-80A microprocesor includes a Z-80A CPU 1804, a programmable input/output port 1806, two kilo-bits of EPROM 1808, and one kilo-bit of RAM 1810. The clock for the microcomputer is a 3.58 MHz video frequency crystal clock to minimize the possibility of electrical interference with the video signals by the computer clock.

The first input/output card 1800 receives the television time sync base from the sensor support electronics (FIG. 17); the signal from the load door switch 262 (FIG. 2); the signal from the film disc seated switch 1434 (FIG. 14); and the two-bit exposure control signal from the exposure control circuit 1712 in the sensor support electronics (FIG. 17). The first input/output card supplies control signals to the light chopper motor 1404; the spindle drive motor 1432; the X-translate motor 1464; the Y-translate motor 1474; the zoom lens motor 1450; and the attenuator adjust motor 1410 (FIG. 14). The first input/output card 1800 also includes a sync detect circuit 1812 that compares the signal from the chopper disc sync sensor 1406 with the television vertical sync time base and indicates proper sync by lighting an indicator light 1814.

The second input/output card 1802 receives signals from the following sensors: the chopper disc sync sensor 1406; the spindle position sensor 1428; the film notch sensor 1440; the X and Y center sensors 1480 and 1470; the zoom sensor 1452; and the attenuator limit sensor 1414 (FIG. 14). The second input/output card supplies the video blanking signal to the image enhancement circuit 1728 (FIG. 17); the lamp power signal to the lamp power circuit 210 (FIG. 2); and power to the door latch and film gate solenoids 266 and 244 respectively. The second input/output card also receives the inputs from the remote operator control unit 122.

Figure 19:
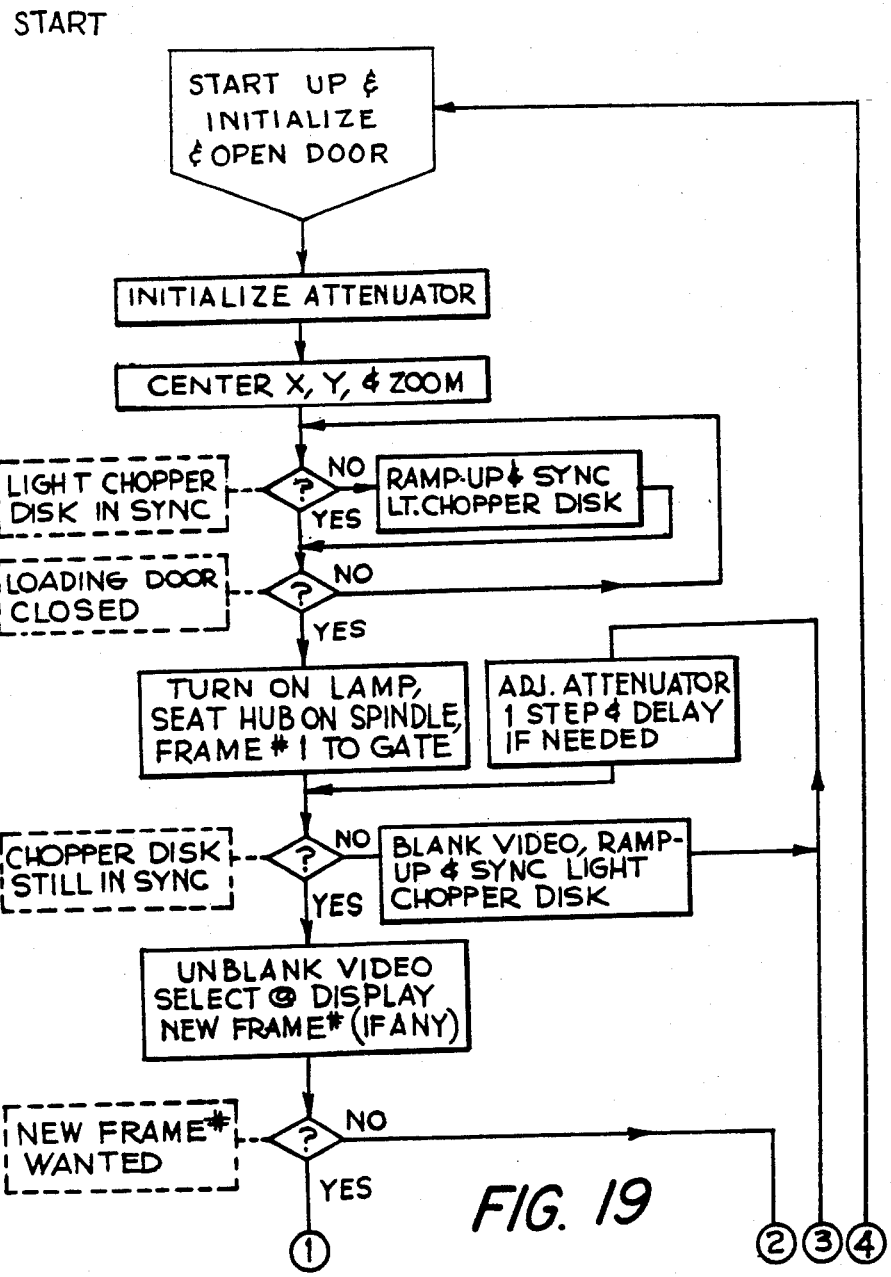
FIGS. 19, 20 and 21 are flow charts of the overall control program for the microcomputer in the system control electronics of the video player.
Figure 20:
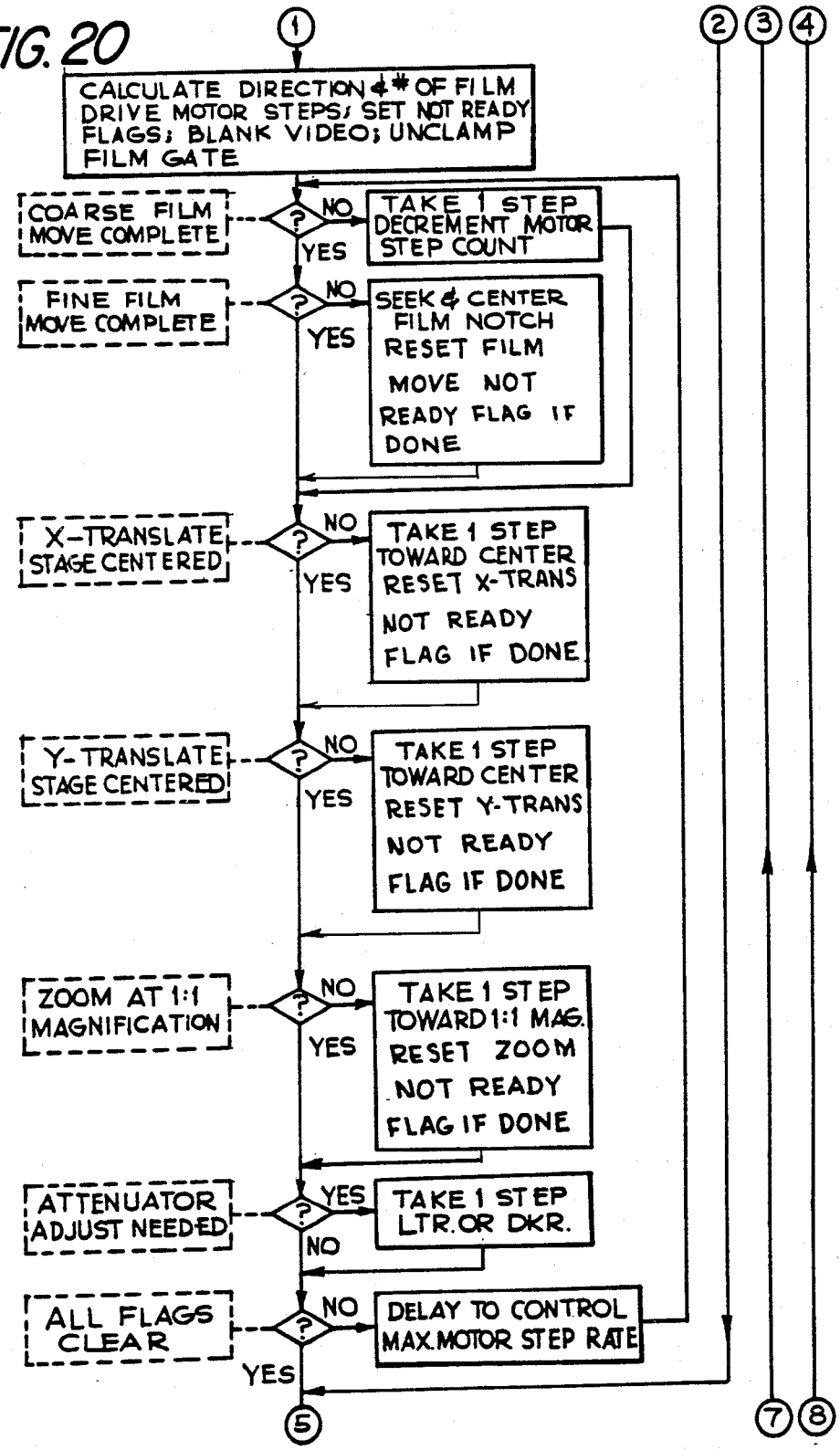
Figure 21:
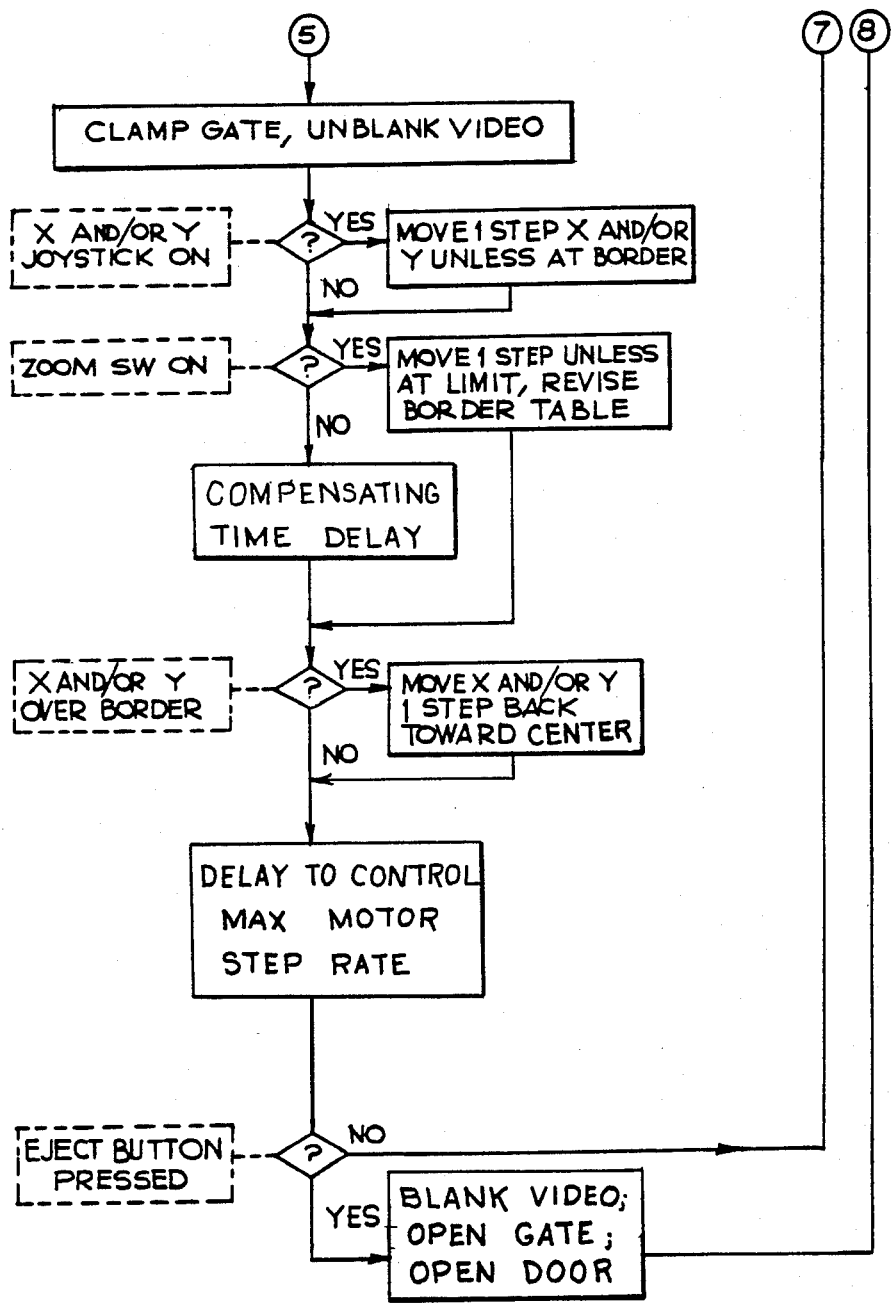

A flow chart of the control program for the microcomputer is shown in FIGS. 19, 20, and 21. FIG. 19 shows the set up procedure followed when the video player is first turned on. When the on/off button 118 is actuated (see FIG. 1), and power is applied to the microcomputer, the microcomputer is first initialized and then the door release solenoid actuated to release the sliding loading door in case it is closed. The computer then initializes the attenuator disc 230 by driving the disc in one direction until the calibration mark 1416 is detected by sensor 1414. Next, the X-Y translation stage 252 is centered in both the X and Y directions by sensing whether or not a stepped vane is blocking light in the X and Y position sensors 1470 and 1480 respectively and determining which side of center the respective translation stage is on. Then the computer commands the respective motor drive to move the translation stage in the direction toward center until a transition of the stepped vane is detected. Similarly, the zoom drive is set at its normal magnification position by driving the zoom drive motor 1450 toward smaller magnification until a transition is detected by the sensor 1452.

Next, the program checks to see if the light chopper disc 226 is in sync with the video vertical sync time base. If not, the program stops the chopper disc and starts it again, until sync is achieved. The computer then checks the status of switch 262 to see if the loading door is closed. If the door is not closed, the program loops until the door is closed, checking on each loop to insure that the chopper disc is still in sync. After the loading door is closed, the program turns lamp 208 on, and actuates the spindle drive motor 1432 to seat the spindle 1522 in the hub of the film disc. The computer knows that the spindle is properly seated in the hub when the film disc seated switch 1434 is closed. The program then advances the film to frame number 1 on the film disc, using signals from the spindle position sensor 1436 and the film notch sensor 1440 to accurately locate the first frame in the film gate.

The program checks again to see if the light chopper disc is still in sync with the vertical sync of the video signal. If not, the program blanks the video, stops the chopper disc and restarts it till sync is achieved. When the light chopper disc is in sync, the program unblanks the video and signals the exposure number display 124 on the remote control unit 122 to display the frame number. Next, the computer checks the frame advance button 126 on the remote control unit 122 to see if a new frame is desired. If no new frame is desired, the program branches to the control monitor portion described below with reference to FIG. 21. If a new frame is called for, the program enters a setup portion shown in FIG. 20. The set up portion of the program quickly returns the X and Y translation servos to their respective center positions and, returns the zoom lens to its normal magnification position, moves the film disc to the new frame position, and adjusts the light attenuator disc if needed. Since an inordinate amount of time would be required (with the video signal blanked) to perform these operations serially, the microcomputer performs them in a quasi-parallel manner. When a new frame number is requested, the computer determines the shortest way to reach the new frame (either by rotating the film disc clockwise or counterclockwise) and calculates the number of motor steps nominally required to reach the required frame. The required number of motor steps is stored in a distance counter computer memory location. Internal flags are set indicating that the film drive, the X and Y drives, and the zoom drive are not ready. The film gate is unclamped by removing power from solenoid 244. The program checks to see if the coarse film movement is completed, if not, it commands the film drive motor to move one step and decrements the distance counter by one. The program then checks to see if the fine film adjustment is completed. If the fine film adjustment hasn't been made, the computer seeks the selected film frame via notch sensor 1440 and centers the notch on the sensor. After the fine film adjustment is completed, the program resets the film move not ready flag. The program next checks to see if the X translate stage 1458 is centered, if not, the program commands X translate motor 1464 to move one step toward center. If the X-translate stage is centered, the program resets the X-translate not ready flag and continues. The program checks to see if the Y translate stage 1460 is centered, and if not, commands Y translate motor 1474 to move one step toward center. If the Y-translate stage is centered, the program resets the Y-translate not ready flag and continues. Next, the program checks to see if the zoom is at normal magnification, if not, it commands zoom motor 1450 to move one step toward normal magnification. If the zoom is at normal magnification, the program resets the zoom not ready flag and continues. The program then checks the exposure control signal to see if the first exposure control bit is "on" or "off". If it is "on", the program commands the light attenuator disc to move one step toward lighter or darker based on the second exposure control bit. The program then checks to see if all flags are cleared, if not, it executes a delay equal to the time required for the slowest stepper motor to execute one step, and then loops back through the setup portion of the program. Since it takes much less than one motor step time to execute the setup portion of the program, the scan and zoom drive motors are running substantially in parallel, thereby minimizing the time required for a new frame setup. As each servo reaches its desired position, the respective not ready flag for that servo is cleared, until all the flags have been cleared. The computer then exits this portion of the program. In this way, the maximum time spent adjusting all the drives to their respective initial setup positions is approximately equal to the time that it takes to adjust the slowest motor drive of the group.

The program clamps the film gate, unblanks the video display, and enters into a portion of the program (shown in FIG. 21) that monitors and executes the zoom and scan inputs from the remote control unit 122.

In a manner similar to the previously discussed setup portion of the program, this portion of the program saves time by moving the X and Y scan motors and the zoom motor in a quasi-parallel fashion. To insure that the image sensor 246 is not moved past an edge of the projected image of the film frame, a border table comprising a set of X and Y limit coordinates for each magnification is programmed in computer memory. For example, at normal magnification, the X and Y translation stages must be centered, but at maximum magnification, the X and Y stages can be moved to their extremes without moving the sensor past the border of the image. At different intermediate magnifications, there are different limits as to how far the sensor can be displaced from its centered position.

The program monitors the X and Y joystick signals from remote control module 122 and when X and/or Y is on, commands the respective scan drive to move one step, unless a border has been reached, in which case the command to move will not be executed. Next, the program samples the output of the zoom switch and commands the zoom to move one step forward or back depending upon the polarity of the zoom command. The program also updates the border table to include the new borders that are allowed after the one step zoom has been executed. In the event that the zoom switch is not actuated, the program flow falls into an equalizing time delay for the purpose of equalizing the program execution times whether or not the zoom switch is operated. Ultimately this leads to a uniform scan motor step rate regardless of whether or not a zoom motion is simultaneously selected. Next, the program checks the X and Y borders to see if the previous zoom command moved the sensor past the X and/or Y border for the new zoom position. If so, the program commands the X and/or Y stepper motor servo to move back toward the center one step.

The program loops through this zoom and scan monitor portion until all requested moves have been made, and all border criteria are satisfied. Video is displayed continously during this portion of the program. After all border criteria are satisfied and all the commanded moves have been accomplished, the program checks to see if the eject button has been depressed. If not, the program returns to the first portion FIG. 19, checks and adjusts the exposure if required, checks to insure that the light chopper is still in sync, and then checks the inputs from the remote control module in case a new command is requested. When the computer senses that the eject button 132 is depressed, it blanks the video, releases the film gate then actuates solenoid 266 to release the load door latch, and returns to the beginning of the program.

The invention has been described in detail with reference to a particular embodiment, however, it will be understood that variations and modifications can be made within the spirit and scope of the invention as defined by the accompanying claims.

We claim:

1. A film video player for scanning color negative film to produce a color video signal, comprising:
    (a) film gate means for holding the color negative film;
    (b) a solid state area image sensor responsive to control signals for producing color video signals, comprising:
        (1) a charge coupled device area array having rows and columns of image sensing elements, responsive to scene light for producing photosignals, and
        (2) an array of color filters disposed over said image sensing array,
    (c) means for flash illuminating the film in said film gate during the vertical retrace intervals of said video signals;
    (d) means for projecting an image of said film in said film gate onto said image sensor;
    (e) control signal generating means for supplying said image sensor with control signals to produce said color video signals at a standard video field rate; and
    (f) signal processing means responsive to the color video signals produced by said image sensor for inverting said color video signals to produce positive color video signals.

2. The invention claimed in claim 1, wherein said solid state area image sensor further comprises a pair of output shift registers, one of said output shift registers being arranged to receive photosignals from odd numbered columns of said area array, and the other of said shift registers being arranged to receive photosignals from even numbered columns of said area array, whereby the frequency of output control signals is reduced by one half.

3. The invention claimed in claim 2, wherein said color filter array comprises a pattern of stripes over said columns of image sensing elements, alternate stripes in said pattern having green filter stripes and the other stripes alternating between red and blue stripes, whereby only "green" photosignals are produced by one of said output registers, and alternating "red", and "blue" photosignals are produced by the other of said output registers.

4. The invention claimed in claim 3, further comprising means for separating the "red" and "blue" photosignals from said other output register to produce separate "red" and "blue" video signals, said separating means comprising two sense and reset output amplifiers for detecting and amplifying the output signals from said output register, and means for alternately actuating one or the other of said output amplifiers.

5. A single frame charge coupled device image sensor adapted for use in a film video player having means for flash illuminating said image sensor during the vertical retrace intervals of a standard video signal, comprising:
    (a) an area array having rows and columns of image sensing elements responsive to scene light for producing photosignals;
    (b) a pattern of color filter stripes disposed over the columns of said area array, alternate stripes in said pattern being green, and the other stripes alternating between red and blue;
    (c) first output register means for receiving row-by-row, the photosignals from said columns covered by green stripes and delivering said photosignals serially to an output location to produce a "green" video signal; and
    (d) second output register means for receiving row-by-row, the photosignals from said columns covered by red and blue stripes, and delivering said photosignals to a second output location to produce a multiplexed "red" and "blue" video signal.

6. The invention claimed in claim 5, wherein said first and second output registers are four-phase CCD shift registers having cells comprising respectively a first transfer electrode, a first storage electrode, a second transfer electrode, and a second storage electrode, said first storage electrodes of said first output register being disposed with respect to said area array to receive photosignals from odd columns thereof, said second storage electrodes being disposed to receive photosignals from even columns thereof, said second storage electrodes of said first and second readout registers being charge coupled, whereby, photosignals from even columns of said array are transferred to said second output register through said first output register.

7. The invention claimed in claim 6, wherein said first transfer electrodes of said first and second output register are electrically connected, said first storage electrodes of said first and second output register are electrically connected, and said second transfer electrodes of said first and second output registers are electrically connected, and wherein said second storage electrodes of said first and second output register are charge coupled by means of a transfer gate.

* * * * *